United States Patent [19]
Graverholt et al.

[11] Patent Number: 5,529,409
[45] Date of Patent: Jun. 25, 1996

[54] RIBBON CARTRIDGE FOR A COMPACT REMOTE-DRIVEN ENCODER

[75] Inventors: James M. Graverholt, Woodinville; William L. Landsborough, Bothell, both of Wash.

[73] Assignee: Maverick International, Inc., Mukilteo, Wash.

[21] Appl. No.: 393,867

[22] Filed: Feb. 23, 1995

Related U.S. Application Data

[62] Division of Ser. No. 123,001, Sep. 16, 1993, Pat. No. 5,474,393.

[51] Int. Cl.$^6$ ................................................ B41J 35/28
[52] U.S. Cl. ........................ 400/208; 400/208.1; 400/234
[58] Field of Search ................................ 400/208, 208.1, 400/217, 234, 236, 235

[56] References Cited

U.S. PATENT DOCUMENTS

| | | | |
|---|---|---|---|
| 4,492,483 | 1/1985 | Guillaume | 400/208 |
| 4,505,605 | 3/1985 | Hasegawa et al. | 400/208 |
| 4,552,473 | 11/1985 | Pawlak | 400/208 |
| 4,609,298 | 9/1986 | Shioda | 400/208 |
| 4,668,961 | 5/1987 | Hiramatsu | 400/208 X |
| 5,026,181 | 6/1991 | Ahn | 400/208 |
| 5,085,531 | 2/1992 | Gillio | 400/234 |

*Primary Examiner*—Christopher A. Bennett
*Attorney, Agent, or Firm*—Jensen & Puntigam

[57] ABSTRACT

The encoder cartridge includes a cartridge body which is divided interiorly into upper and lower portions. A ribbon is mounted on a feed spool in the upper portion and feeds through a series of guide elements to a lower portion which includes a take-up reel upon which the ribbon is wound by a traction gear member which is in turn advanced by a motor. The cartridge body is configured to match closely that of the feed spool and take-up reel, with an opening at one end of the body for the ribbon, the opening being substantially smaller than the width of the cartridge and similar to the diameter of the encoder font wheel.

4 Claims, 20 Drawing Sheets

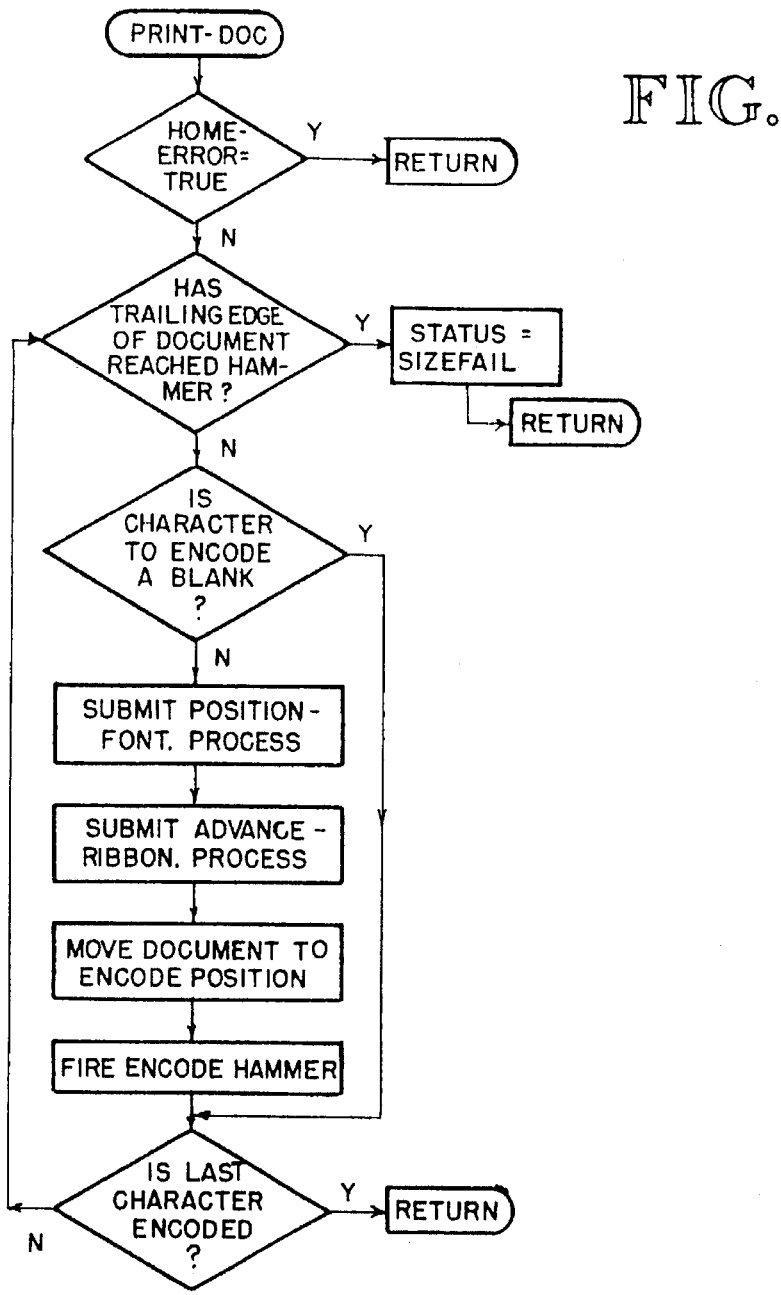
FIG. 12
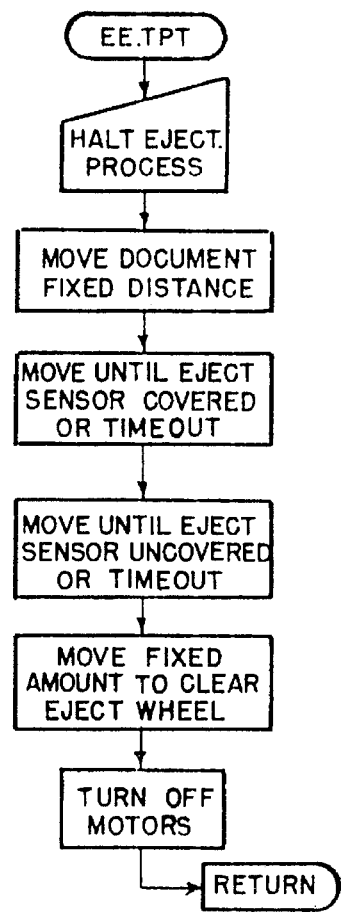
FIG. 16
FIG. 20
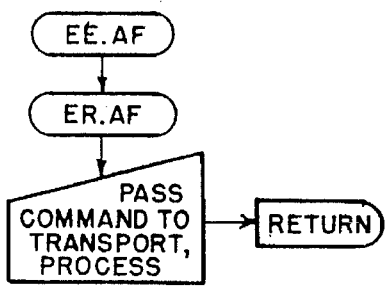

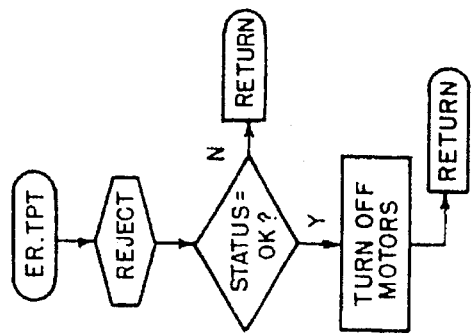
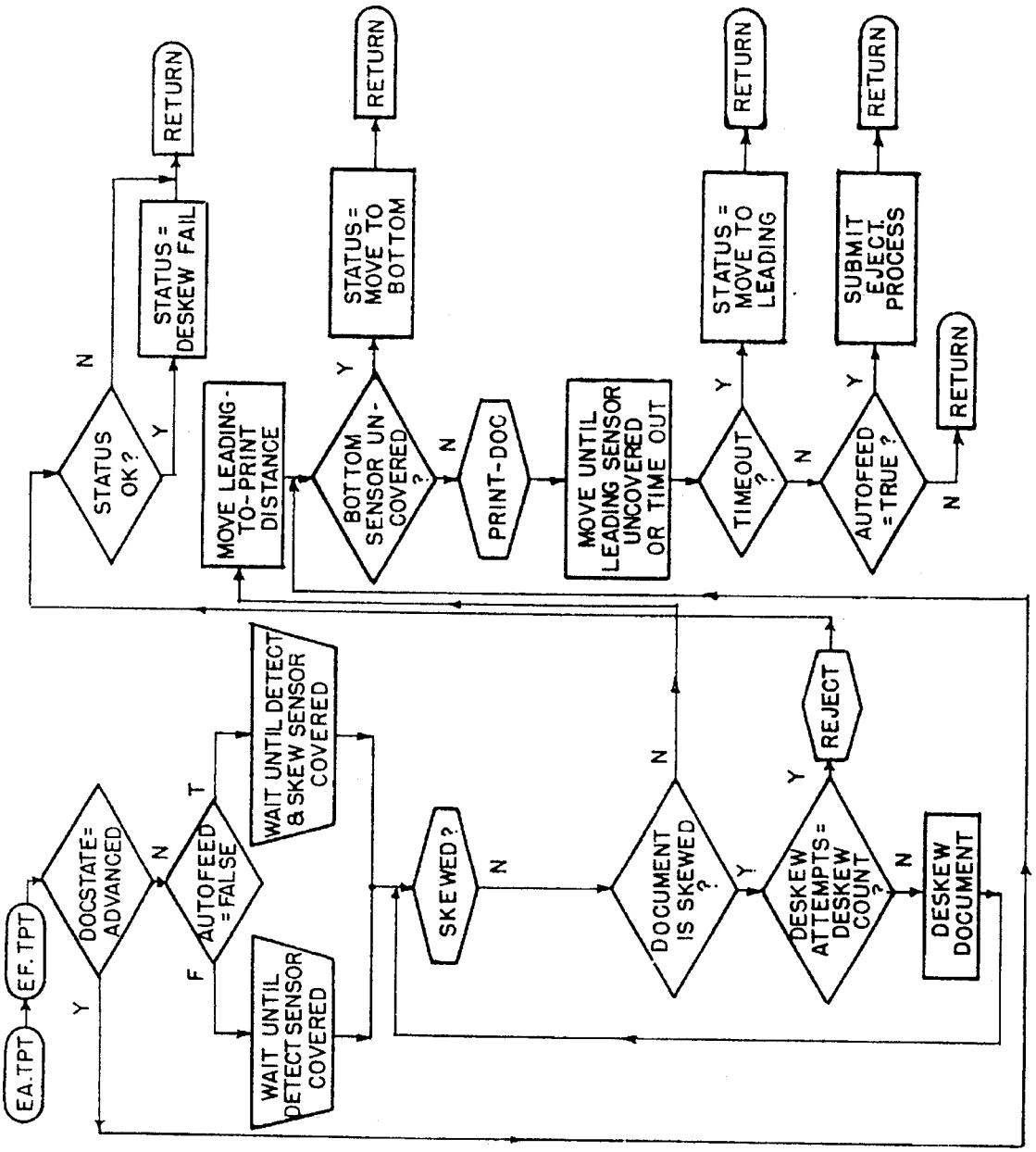

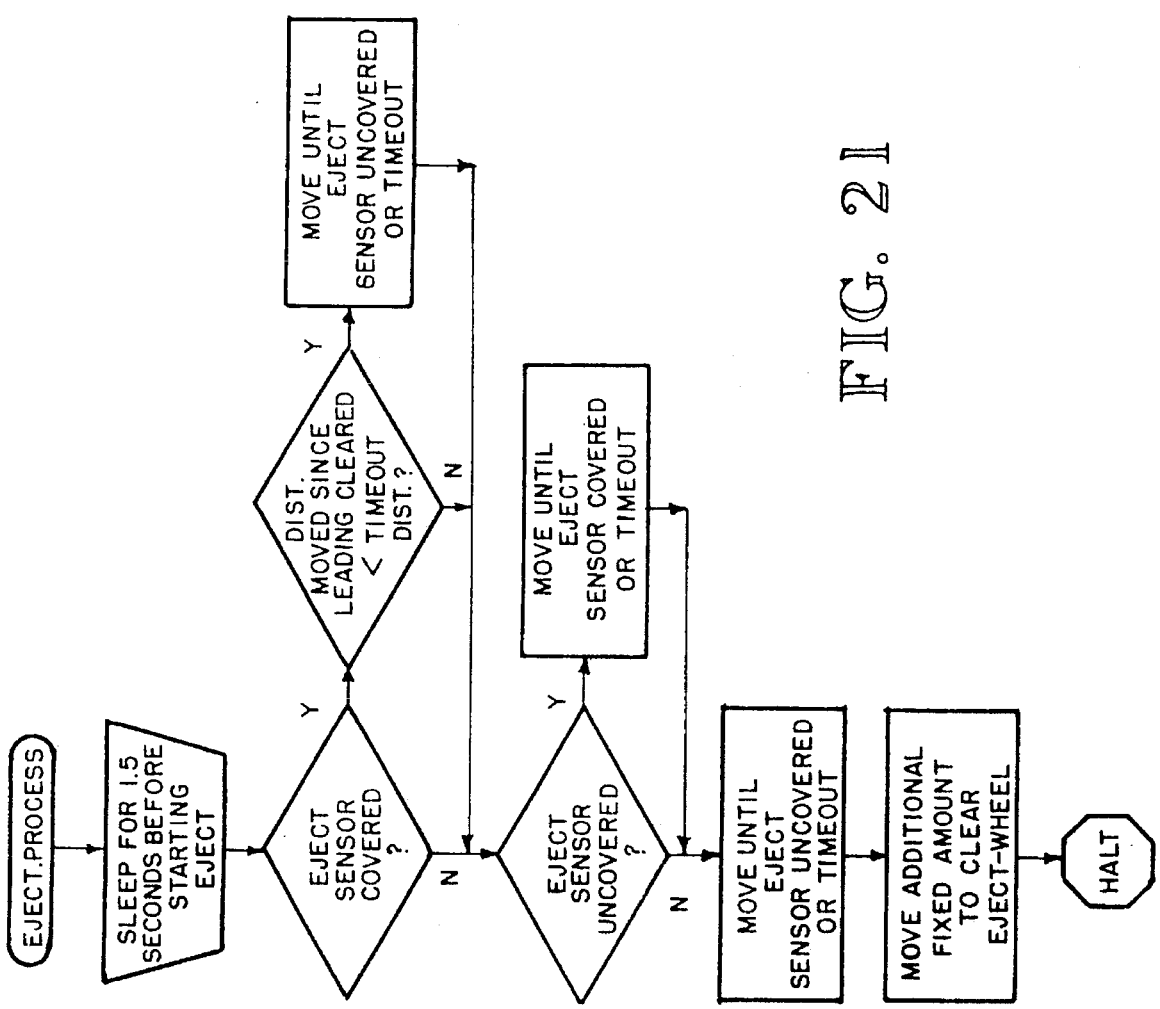
FIG. 21
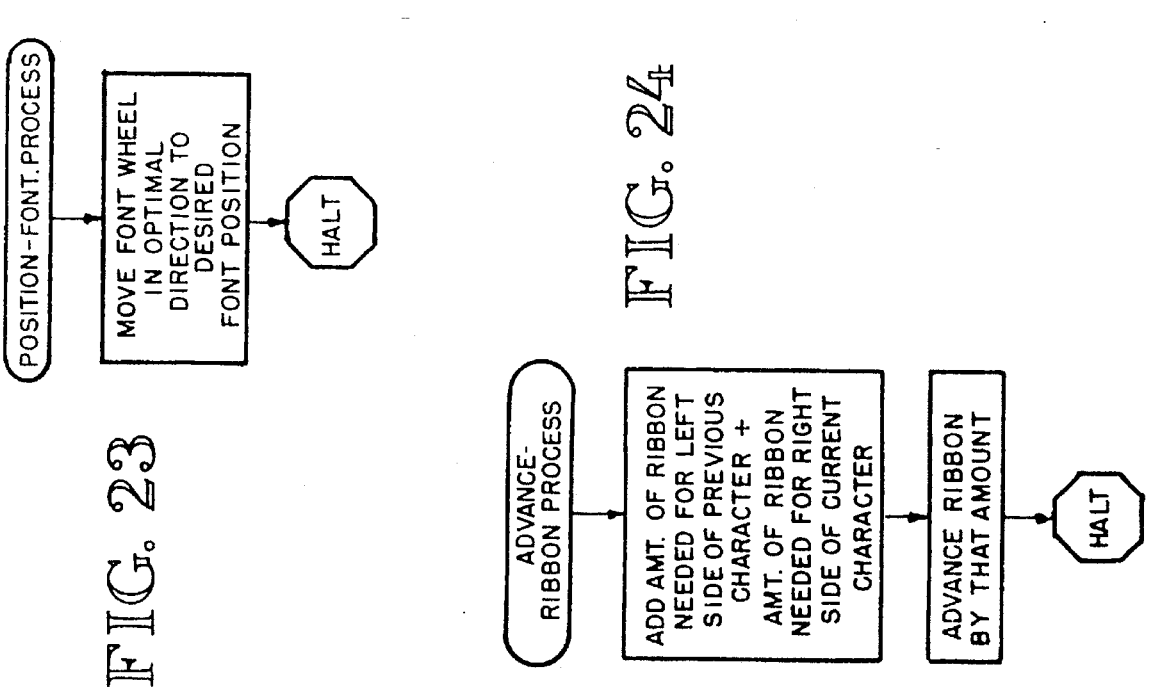
FIG. 23
FIG. 24

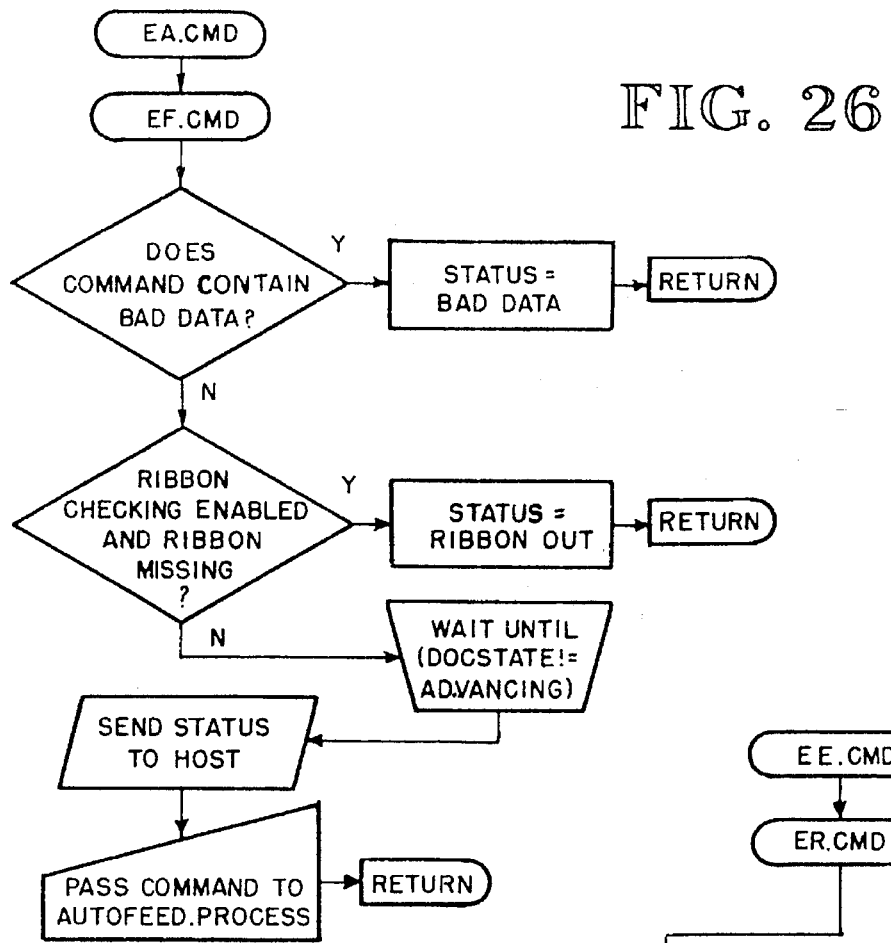
FIG. 26
FIG. 27
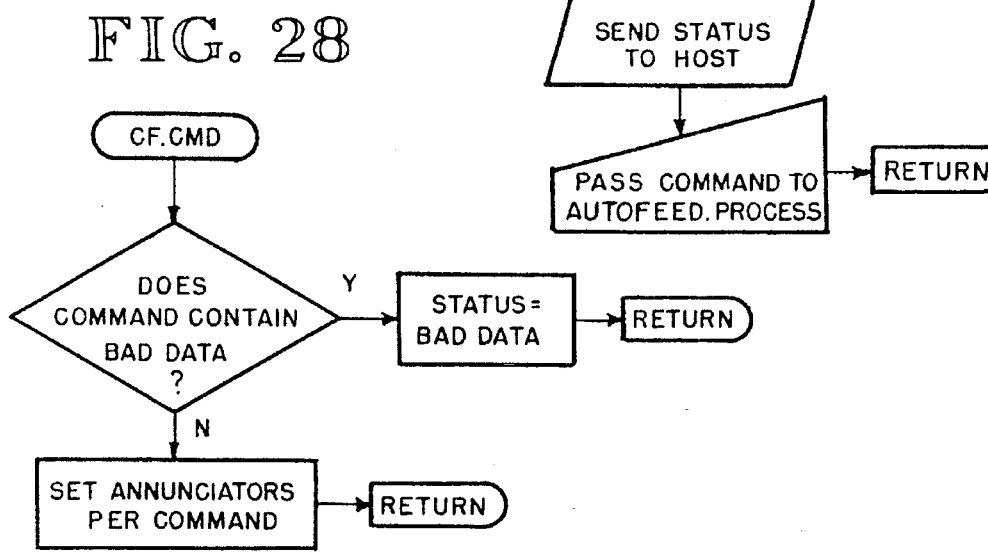
FIG. 28

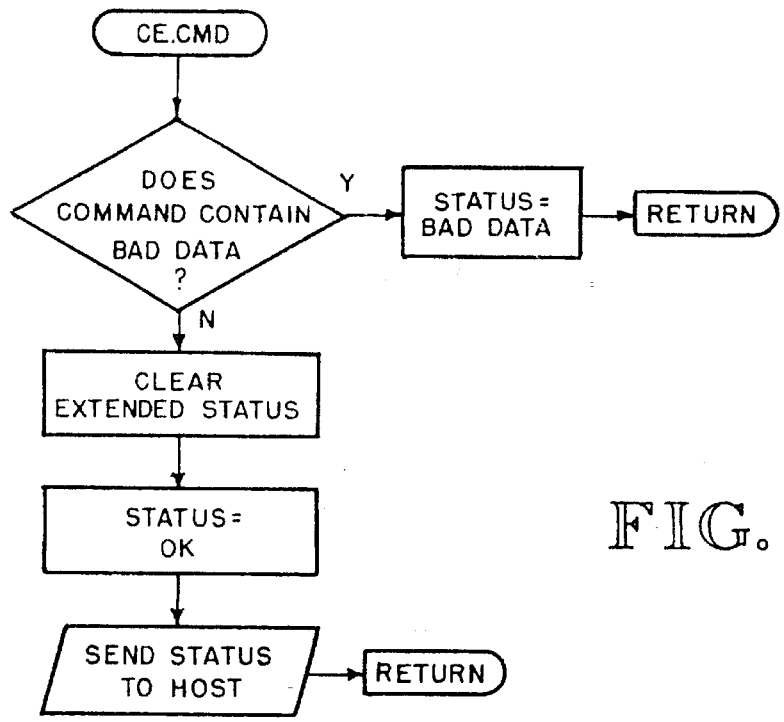
FIG. 32
FIG. 33
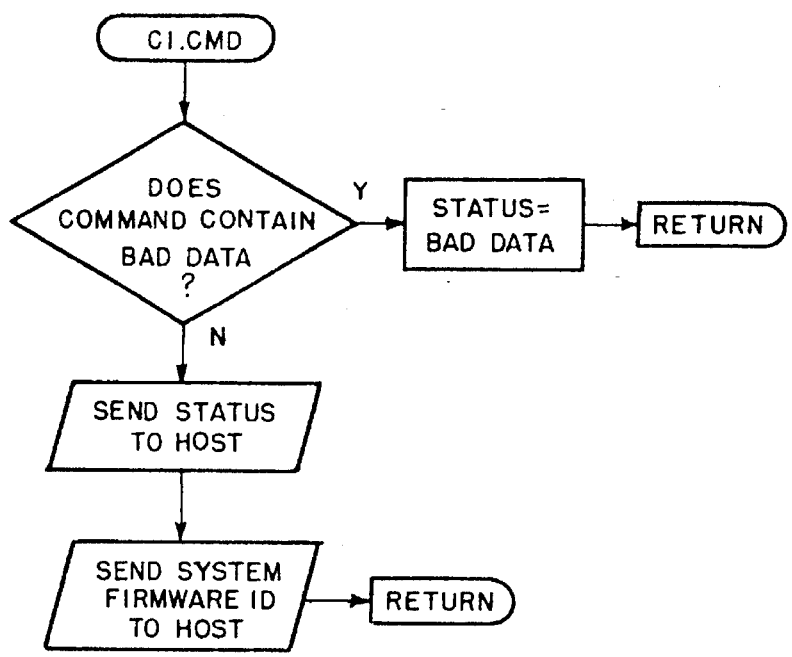

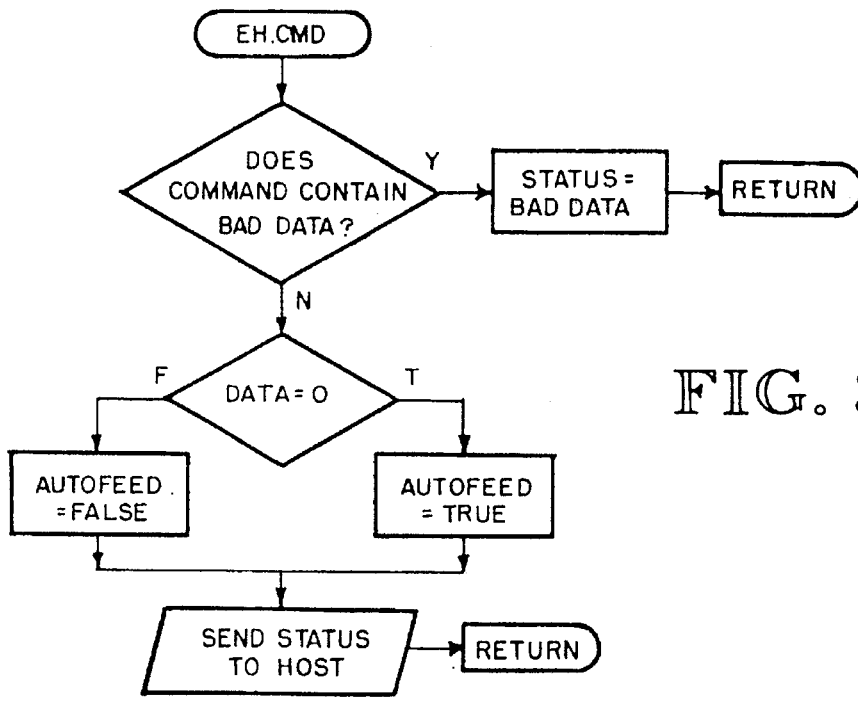
FIG. 34
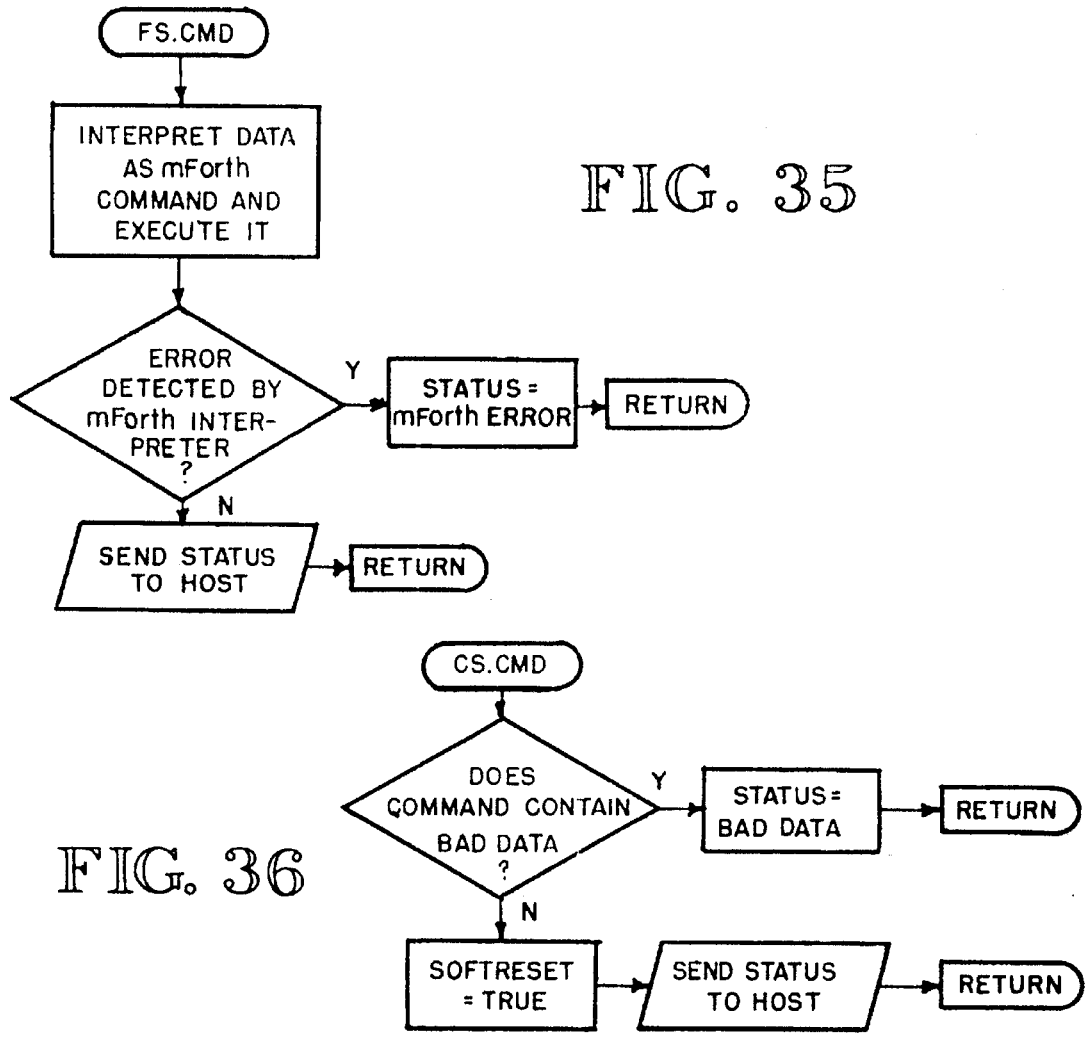
FIG. 35
FIG. 36

5,529,409

RIBBON CARTRIDGE FOR A COMPACT REMOTE-DRIVEN ENCODER

This is a divisional of application Ser. No. 123,001, filed on Sep. 16, 1993 now U.S. Pat. No. 5,474,393.

TECHNICAL FIELD

This invention relates generally to the art of document encoders and more specifically concerns such an encoder which is remotely driven by various devices or systems.

BACKGROUND OF THE INVENTION

Document encoders are used in a variety of situations to accomplish a number of different tasks, among them the encoding of checks. Checks are encoded to facilitate processing thereof against an account. The encoding is typically done at the bank or other central facility. It is often desirable, however, to encode checks with the required information at the retail level, such as at a grocery store, so as to decrease the overall processing time of those checks through the banking system. In such a situation, encoders are used as part of an overall cash settlement system and are driven by the central processor portion of the system, instead of operating as a stand-alone instrument. Currently available encoders attempting to operate in such a system context, however, have a number of deficiencies. Typically, they are not fast enough and hence do not provide sufficient document throughput. In addition, such encoders are frequently too large for convenient use at the retail level and also typically require a substantial amount of hand labor to operate. Further, such encoders have not been reliable in operation and thus are frequently maintenance intensive.

The present invention is a compact encoder apparatus designed to be used as part of an overall cash settlement or comparable system. The apparatus features an automatic check feeding system and a convenient check catch tray, both which are designed to be integral parts of the apparatus. A particular structural arrangement of system elements defining a check guide path results in the present invention overcoming many of the difficulties encountered with prior art encoders.

SUMMARY OF THE INVENTION

Accordingly, the present invention is a compact, remotely driven MICR encoder, which includes: a tray for storing documents, such as a check, to be encoded; means for moving the documents from the tray into a document guide path, wherein in operation of the apparatus the documents contact and move around a portion of the document moving means, wherein the document guide path includes a portion located immediately downstream from the document moving means, into which the document moves upon leaving contact with the document moving means, the first portion extending at a substantial angle relative to the orientation of the document when it initially comes into contact with the document moving means. The apparatus further includes means positioned along the document guide path for encoding the document, means for moving documents past the encoding means and means for moving the encoded document away from the encoding means.

BRIEF DESCRIPTION OF THE DRAWINGS

FIGS. 9–38 comprise a flow chart for the software control of the apparatus of FIGS. 1–4.

BEST MODE FOR CARRYING OUT THE INVENTION

Figure 1:
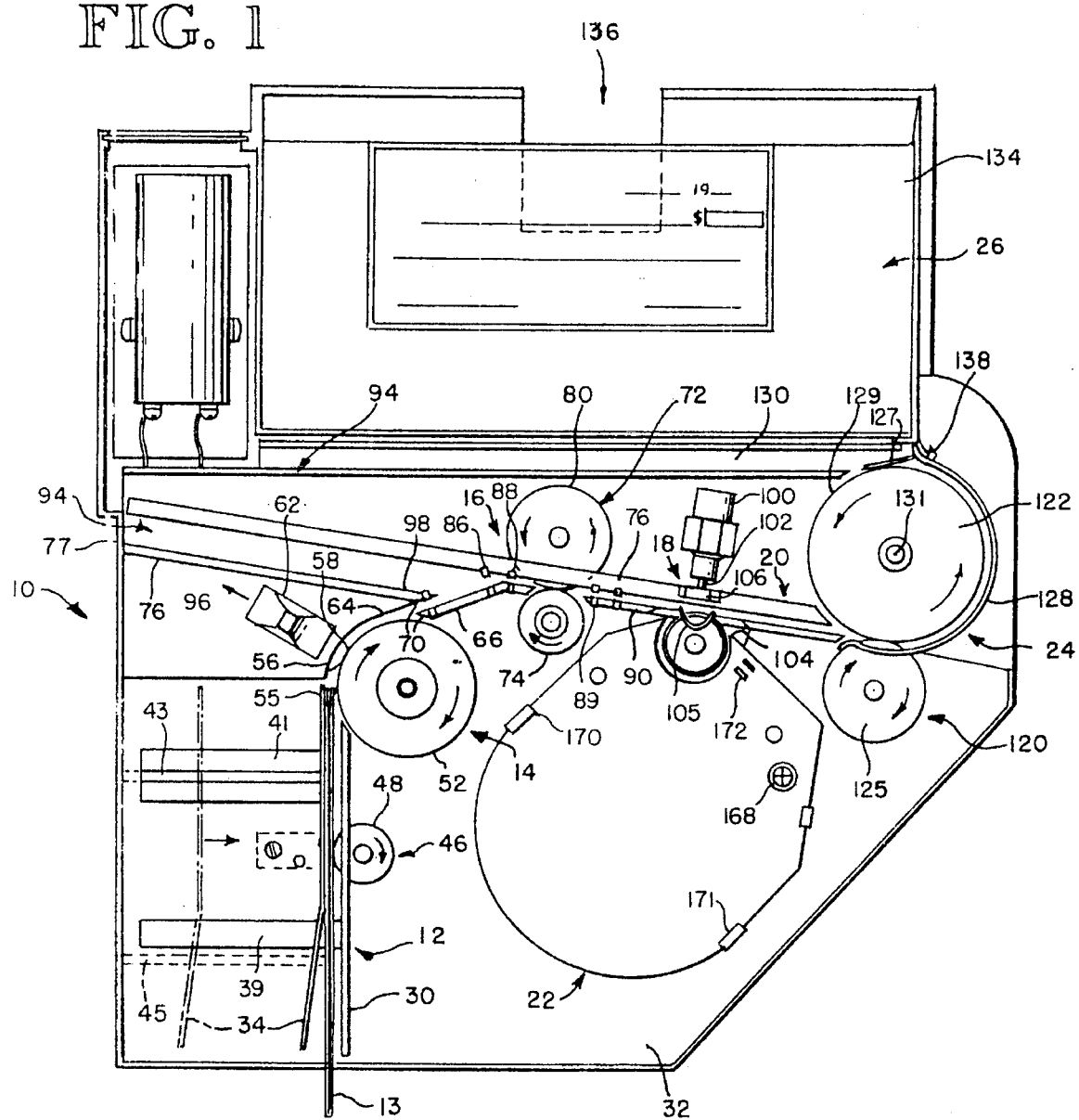
FIG. 1 is a top plan view of the encoder apparatus of the present invention.

FIGS. 1–4 show in general the structure of the encoder of the present invention. Referring to FIG. 1 in particular, the apparatus, shown generally at 10, includes an autofeed tray assembly 12 where a number of checks may be stored for encoding. An autofeed roller assembly is shown generally at 14, while a check encoding system, positioned downstream of the autofeed roller assembly 14, includes a first drive assembly 16, a printing assembly 18 and a second drive assembly 20. A ribbon cartridge 22 forms part of the printing assembly 18. Downstream of the check encoding system is a check eject assembly 24. Lastly, downstream of the check eject assembly 24 is a check catch assembly 26, which receives the checks after they have been processed through the apparatus.

The various assemblies described above are arranged so that the resulting encoder apparatus is quite compact and presents a relatively small footprint, yet is also very reliable in check processing operation and capable of extremely high throughput rates. The autofeed tray assembly 12 and the check catch assembly 26 furthermore are structurally integrated into the apparatus, i.e. they are not add-on or accessory units. Such an arrangement contributes to the compactness of the apparatus and improves the reliability of the apparatus.

Figure 3:
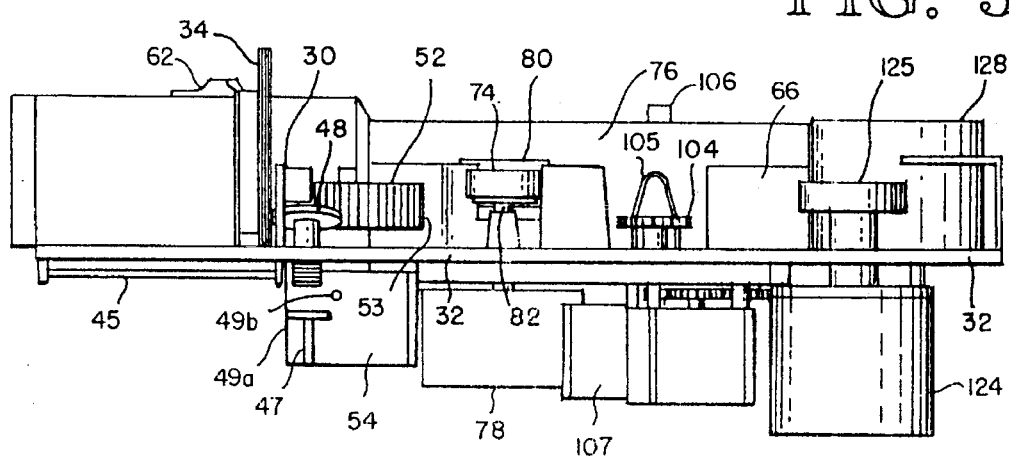
FIG. 3 is a side-elevational view of the apparatus of FIG. 1.
Figure 2:
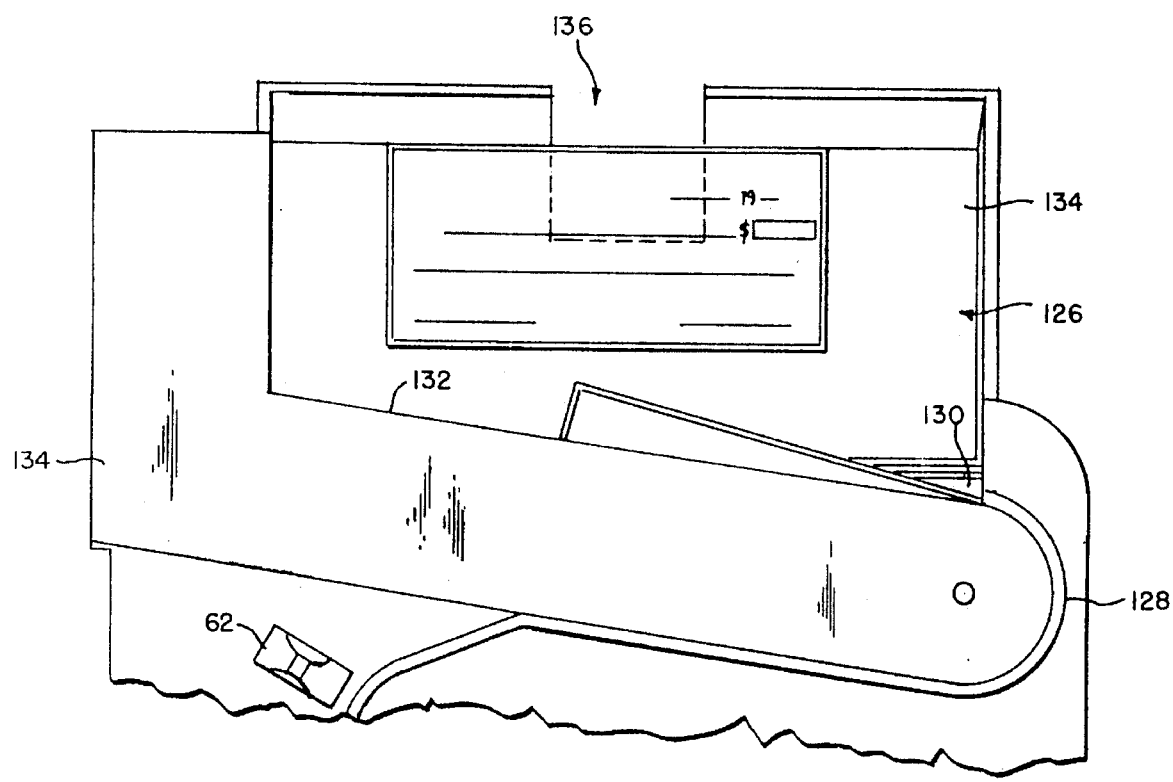
FIG. 2 is a top plan view of a portion of the encoder apparatus of FIG. 1, showing the top cover in place.
Figure 4:
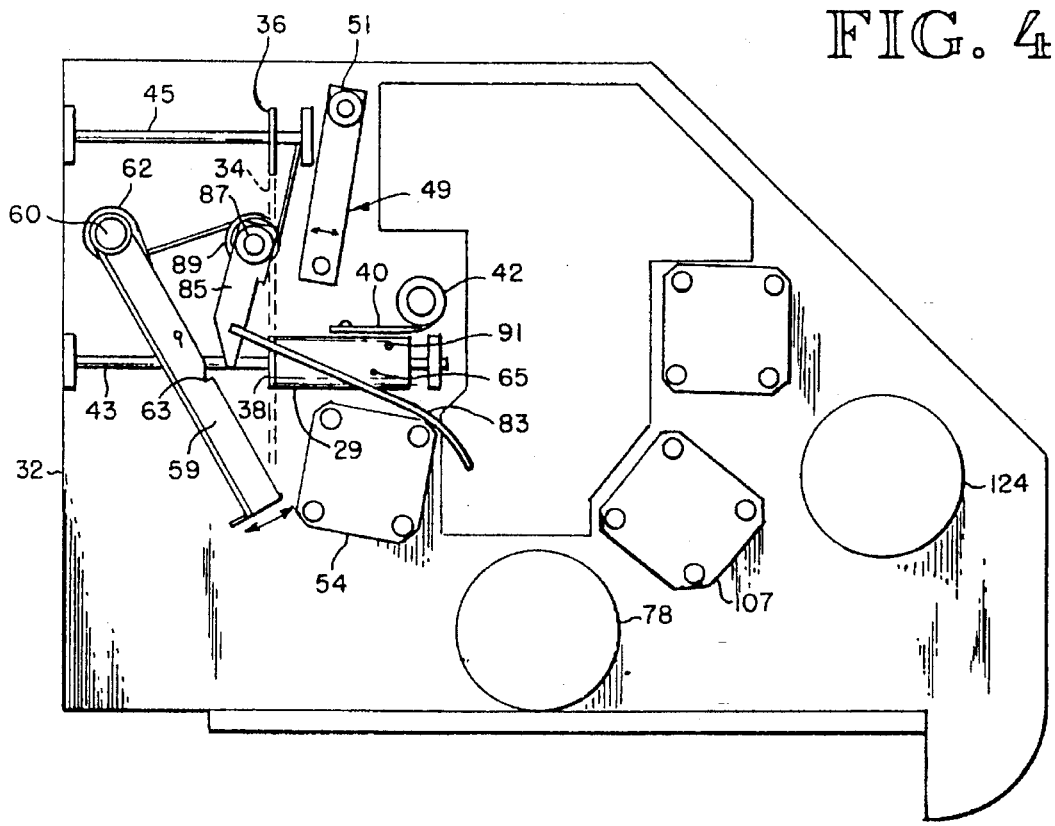
FIG. 4 is a bottom plan view of the of the apparatus of FIG. 1.

More specifically, referring to FIGS. 1–3, the autofeed tray assembly 12 includes a fixed reference plate 30 which in the embodiment shown extends in an upright position from a base plate 32 of the apparatus. Reference plate 30 is in the embodiment shown approximately 5 inches long and approximately 1¼ inches high and in the embodiment shown is an integral part of base plate 32. To the left of reference plate 30 in FIG. 1 is a movable pressure plate 34. Extending from the lower edge of pressure plate 34 are two tabs 36 and 38 which extend through elongated openings 39, 41 in base plate 32 and are supported for slidable movement along two rods 45 and 43, such that pressure plate 34 is free to move away from and toward reference plate 30. Tab 43 is furthermore connected to a slidable block 29 to which is connected a solid wound, constant force spring member 40, which unwinds from spool 42 as pressure plate 34 is moved away from reference plate 30 to the left in FIG. 1. The action of spring member 40 tends to maintain pressure plate 34 against reference plate 30.

A substantial number of documents, such as checks, on the order of 150 to 200 in the embodiment shown, may be placed in the autofeed tray by moving pressure plate 34 away from reference plate 30 by hand and then positioning the checks, also by hand, between pressure plate 34 and reference plate 30.

Positioned approximately midway along the length of reference plate 30, and partially extending therethrough, is a deskewing roller 46 (FIG. 1). Deskewing roller 46 is spring-biased about a pivot point 51 through pivot assembly 49 (FIG. 4) in the direction of pressure plate 34, and includes a circular mounting element 48 mounted for rotation on a shaft 47 which extends through base plate 32 and is slightly inclined in the direction of the downstream end of reference plate 30. Mounting element 48 includes a urethane O-ring thereon, which contacts the front surface of the first check between reference plate 30 and pressure plate 34. As a check is moved into the check guide path from the autofeed tray, deskewing roller 46 tends to force the check downwardly so that its bottom edge is positioned against the upper surface of base plate 32, which defines the lower surface of the check guide path.

Mounted on shaft 47 is an encode wheel 49a which is a clear plastic disk with radially spaced dark bands. An autofeed sensor 49a is positioned to detect the presence/absence of the dark bands. Movement of the front-most document in the autofeed tray will turn the deskewing roller 46 and hence the encode wheel 49a. This movement is detected by the sensor 49b and transmitted to the software control. If the front-most document does not advance properly through the apparatus, as detected by downstream sensors, then an error is indicated, requiring operator intervention. This feature insures that the documents move out of the autofeed tray in proper sequence.

Positioned at the downstream end of autofeed tray assembly 12 is an autofeed roller 52, its associated drive motor 54, and a check stripper element 56. Autofeed roller 52 includes a rubber roller element 53 having a serrated edge, approximately 2 inches in diameter and approximately ½ inch high. Roller 52 includes a one-way clutch so that roller element 53 may be driven in only one direction (clockwise in the embodiment shown). Roller element 53 is free to turn on its mounting shaft, however, when drive motor 54, which is a stepper motor in the embodiment shown, is in an off condition.

The check stripper element 56 is approximately ½ inch square and is located immediately downstream of the pressure plate 34. The stripper element 56 has a 90 durometer cast urethane pad 58 on the front surface thereof, which in operation is in slight physical contact with the edge of roller element 53. Autofeed roller 52 moves the checks out from autofeed tray assembly 12. The rubber comprising roller element 53 is flexible and tends to grab the check better than urethane pad 58. Stripper element 56 (with pad 58) is mounted so that it moves horizontally toward and away from the edge of roller element 53. Stripper element 56 is mounted on an arm 59 which extends vertically downwardly through base plate 32 and then extends horizontally to a pivot point 60 on the under surface of base plate 32. A spring 62 tends to bias arm 59 clockwise, so that pad 58 is in contact with roller element 53. The horizontal portion of arm 59 beneath base plate 32 has a notch 63 in one edge thereof. Slidable block 29 has a first pin 65 extending downwardly from the lower surface thereof.

Movement of pressure plate 34 away from reference plate 30 results in pin 65 nestling in notch 63, with arm 59 then rotating about pivot point 60, with corresponding movement of stripper element 56, until arm 59 locks in position, with pin 65 still in the notch, such that pressure plate 34 is held a distance away from reference plate 30. When the checks have been inserted between plates 30 and 34, a finger tab 62 which extends from the vertical portion of arm 59 and is accessible to the user is moved slightly to the rear, which releases arm 59, permitting arm 59 to move clockwise, resulting in pad 58 contacting roller element 53. Pressure plate 34 also moves against the stack of checks, by virtue of the action of spring 40.

To assist in the initial movement of checks from the autofeed tray is a small non-asbestos pad 55 located at the lower rear corner of pressure plate 34. The leading edge of the checks thus tend to be pushed toward autofeed roller 52. The frontmost check in the autofeed tray comes into contact with the edge of the autofeed roller.

Figure 8:
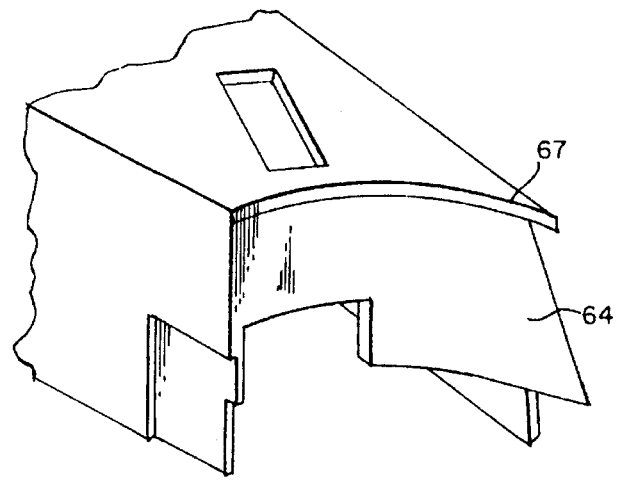
FIG. 8 is a perspective view of a part of a top cover/arcuate wall portion of the encoder apparatus of FIGS. 1–4.

Surrounding stripper element 56 is a curved rear wall section 64 which extends through an arc of approximately 80° to 85°. This wall section forms, along with base plate 32, the initial part of the check guide path along which the check moves through the apparatus following removal from the autofeed tray. Referring now to FIG. 8, at the top of wall section 64 is an extending lip 67. Lip 67 is approximately ¹⁄₁₀ inch thick, and at the rear edge of wall section 64, extends outwardly therefrom approximately $^{60}/_{1000}$'s of an inch. The amount of outward extension increases gradually from zero at the front edge of wall section 64. Lip 67 also extends beyond the rear edge of wall section 64 approximately ¹⁄₁₀th inch. The lip adds a slight twist to the document which keeps the document down against base surface 32.

A second, following section of the check guide path is formed by a plastic forward wall member 66, which extends downstream from roller 52 through the encoder assembly region. Wall member 66 defines the front wall portion of the second section of the check guide. Positioned in an initial portion of wall member 66 is part of a preload sensor assembly 70. Preload sensor assembly 70 comprises a conventional LED/sensor pair positioned on opposite sides of the check guide. The function of preload sensor assembly 70 is discussed below. Sensor assembly 70, as well as the other sensors in the present apparatus, are mounted on blocks which are then set into wall members defining the check guide. The portions of the wall members containing the sensor assemblies are transparent.

The angle of contact between the check and the autofeed roller from its initial contact to the point where the check moves along the check guide path away from the autofeed roller is in the embodiment shown 73°. An acceptable range is 65° to 95°. This angle is important in maintaining high document throughput and reliable operation. Downstream of autofeed roller 52 is a first drive roller 72, which is driven by a motor 78, and an associated pressure roller 74. Wall member 66 at this point angles 20° to 30° (approximately 26° in the embodiment shown) away from the initial portion thereof toward the front of the apparatus, slightly before the first drive roller 72, such that it extends slightly (5°–15°) toward the front of the apparatus, becoming parallel with and positioned a short distance in front of wall member 76, which defines a rear wall portion of the check guide path. Wall member 76 is a flat metal plate which extends from the left edge 77 of the apparatus to the eject roller 24, at a slight angle toward the front of the apparatus. The first drive roller 72 is approximately at a longitudinal midpoint of wall member 76. In the embodiment shown wall member 76 is approximately 11 inches long by 1½ inches high.

The first drive roller 72 is driven by a stepper motor 78 as indicated above and includes an aluminum roller element 80, which in the embodiment shown has a diameter of approximately 1¼ inches and is ⅜ inch high. The peripheral edge of roller 80 has a metal particle gripping surface, which provides a good gripping capability for the check and prevents slipping of the check. This arrangement provides positive control over the movement of the check into and through the encoder assembly area.

The pressure roller 74, which mates with roller 80, is mounted for rotation about a vertical mounting post 82. Roller 74 includes a polyurethane roller element which is relatively soft and is angled slightly downwardly. The mounting post 82 is connected to a lever arm 83 which extends through base plate 32 and then horizontally to a pivot arm 85, which in turn is pivotally mounted about pivot point 87. The pivot arm 85 is biased by a spring 89 in the clockwise direction. A second downwardly extending pin 91 on the lower surface of slidable block 29 contacts pivot arm 85 when pressure plate 34 is moved away from reference plate 30, rotating pivot arm 85 counterclockwise, with lever arm 83 being pulled with pivot arm 85, resulting in pressure roller 74 moving away from contact with roller element 80. It remains in this position when pressure plate 34 is moved sufficiently that arm 59 and block 29 lock in position. Pivot arm 85 is released when tab 62 releases arm 59 and block 29. When arm 59 is locked, so that pressure roller 74 is maintained away from roller element 80, check jams may be readily cleared.

Positioned before drive roller 72 and pressure roller 74 are, in sequence, a deskewing sensor assembly 86 and a detect sensor assembly 88. The deskewing sensor assembly 86 is located near base plate 32 while detect sensor assembly 88 is located a short distance up from base plate 32. Both deskewing sensor 86 and detect sensor 88 comprise LED/sensor pairs.

In autofeed operation, a check is moved by autofeed roller 52 past deskew roller 46 from the autofeed tray to the point where the leading edge of the check is recognized by the preload sensor assembly 70, following a previous recognition that sensor 70 is "clear". At this point, the check is stopped by the autofeed roller 52, until the previous check has completely cleared detect sensor 88. The check is then moved by the autofeed roller to the point where the leading edge of the check is recognized by detect sensor 88.

Immediately downstream of first drive roller 72 and pressure roller 74 is a bottom edge (dog-ear) sensor assembly 89, followed by a leading edge sensor assembly 90. Bottom edge sensor 89 and leading edge sensor 90 are positioned relative to base plate 32 similarly, respectively, to deskew sensor 86 and detect sensor 88. Sensors 89 and 90 also each comprise an LED/sensor pair. When the previous check clears leading edge sensor 90, autofeed roller 52 will again operate, for a fixed number of steps of the autofeed roller stepper motor, specifically the number of steps necessary to move the check a sufficient distance to where the first drive roller 72 achieves control over the check. The autofeed roller 52 is then turned off, and the document is under the control of the first drive roller 72. The one-way clutch on the autofeed roller permits the check to be "pulled" from the autofeed roller by the action of drive roller 72.

As the check moves further along the check guide path it is under the control of the first drive roller, which advances the check to leading edge sensor 90. Prior to stopping at the leading edge sensor 90, the check passes bottom edge sensor 89. The number of steps of stepper motor 78 required to move the check from bottom edge sensor 89 to leading edge sensor 90 is determined. If the number of steps is not within a certain range, a tear or a dog-ear in the bottom of the check at the leading edge thereof is indicated. The dog-eared check is then advanced until the trailing edge thereof passes detect sensor 88. The check is then moved back past first drive roller 72 into a hand drop/reject portion of the apparatus, shown generally at 94 in FIG. 1 and then out of the apparatus at the left hand side thereof. Portion 94 is defined between third wall member 76 and a fourth wall member 96 which is positioned just forwardly of third wall member 76 in FIG. 1 and which at one end 98 thereof joins the downstream edge of curved wall portion 64.

The hand drop/reject portion 94 also provides an opportunity for the operator to direct, i.e. drop, a check or other document into the apparatus directly, instead of it being fed from the autofeed tray. In this mode of operation, a check or other document is placed into the hand drop/reject portion 94 by the operator. The check is then moved along the check guide path by the operator until the deskew and detect sensors 86, 88 are both covered. The drive roller 72 then turns on and the check is further moved by the operator until the drive roller 72 grips the check, following which the check is controlled by the apparatus.

When the leading edge of the check has been detected and the check has been stopped at leading edge sensor 90, deskew sensor 86 is checked. If the sensor 86 is not blocked, indicating that the check is in fact skewed, the check is backed up by the first drive roller 72 and then advanced again to the leading edge sensor. If the check is still skewed, this process may be repeated a selected additional number of times (typically a total of 3 times). If the check is still skewed, it is then rejected as described above for dog-eared checks.

When the leading edge of a non-dog-eared, non-skewed check reaches the leading edge sensor 90, the check is ready to be encoded.

In typical use of the encoder of the present invention, such as the encoding of checks, an operator will first read the amount on the face of the check and will then begin to key in the amount into the system, i.e. the cash settlement host computer system, which controls the operation of the remote encoder. Typically the check will not be advanced to the encoder portion of the apparatus until the operator has completed entry of the data and has operated the "enter" key. In the present invention, however, the host system will advance the document to the encode position when the operator begins to key the amount into the system. Thus, by the time the operator has completed entry of the data, the check is aligned, positioned and ready to be encoded. This results in a significant increase in document throughput, up to a 20% increase. The encoder assembly includes a solenoid 100 with an extending actuator arm 102. Solenoid 100 is mounted to the rear of third wall member 76. Mounted in front of wall member 66 and partially extending through an opening therein is a conventional font wheel 104, controlled by a stepper motor 107, the font wheel having a plurality of characters thereon, the characters being in compliance with banking regulations concerned with checks. A wire form spring 105 extends upwardly from an edge of the opening in wall member 66, very close to wall member 76, maintaining the check in position in the check guide and the ribbon from the ribbon cartridge 22 in position as well. The font wheel 104 is controlled so that it initially moves to a base or home position when the check is advanced from preload sensor 70. This happens in conjunction with movement of the check. The control system for the apparatus thus at this point knows the position of the font wheel as well as the relative position of the check so that the check need be only moved a selected distance and encoding can begin at a precise point on the check.

Figure 7:
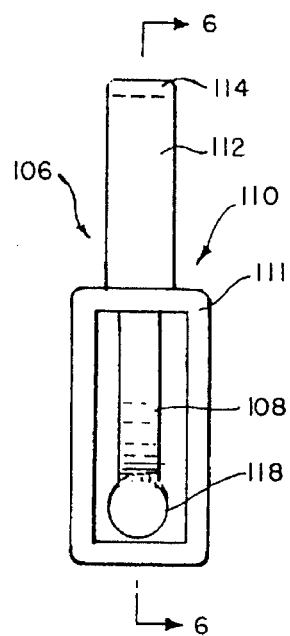
FIG. 7 is a front elevational view of the hammer of FIG. 6.
Figure 6:
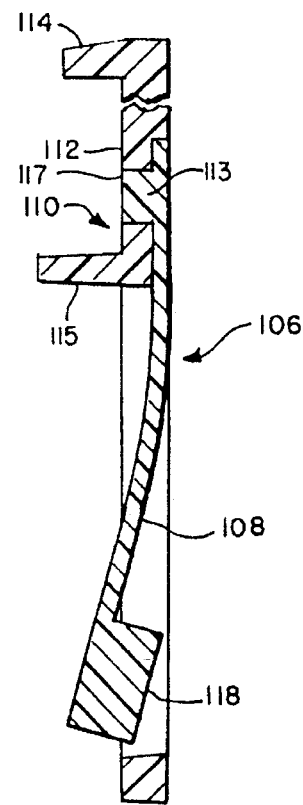
FIG. 6 is a side-elevational view of a removable hammer useful with the encoder apparatus of FIGS. 1–4.
Figure 9:
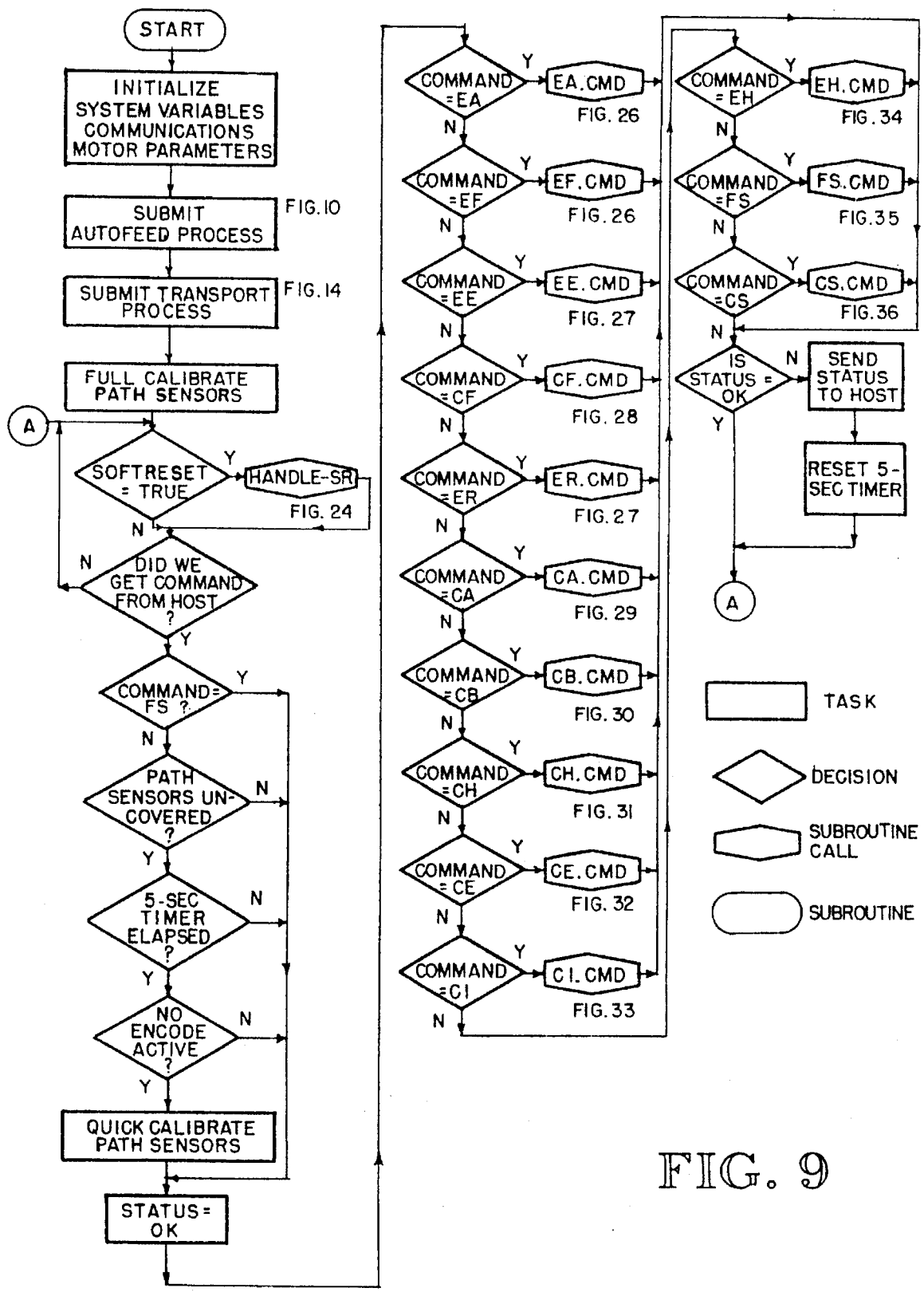
Figure 10:
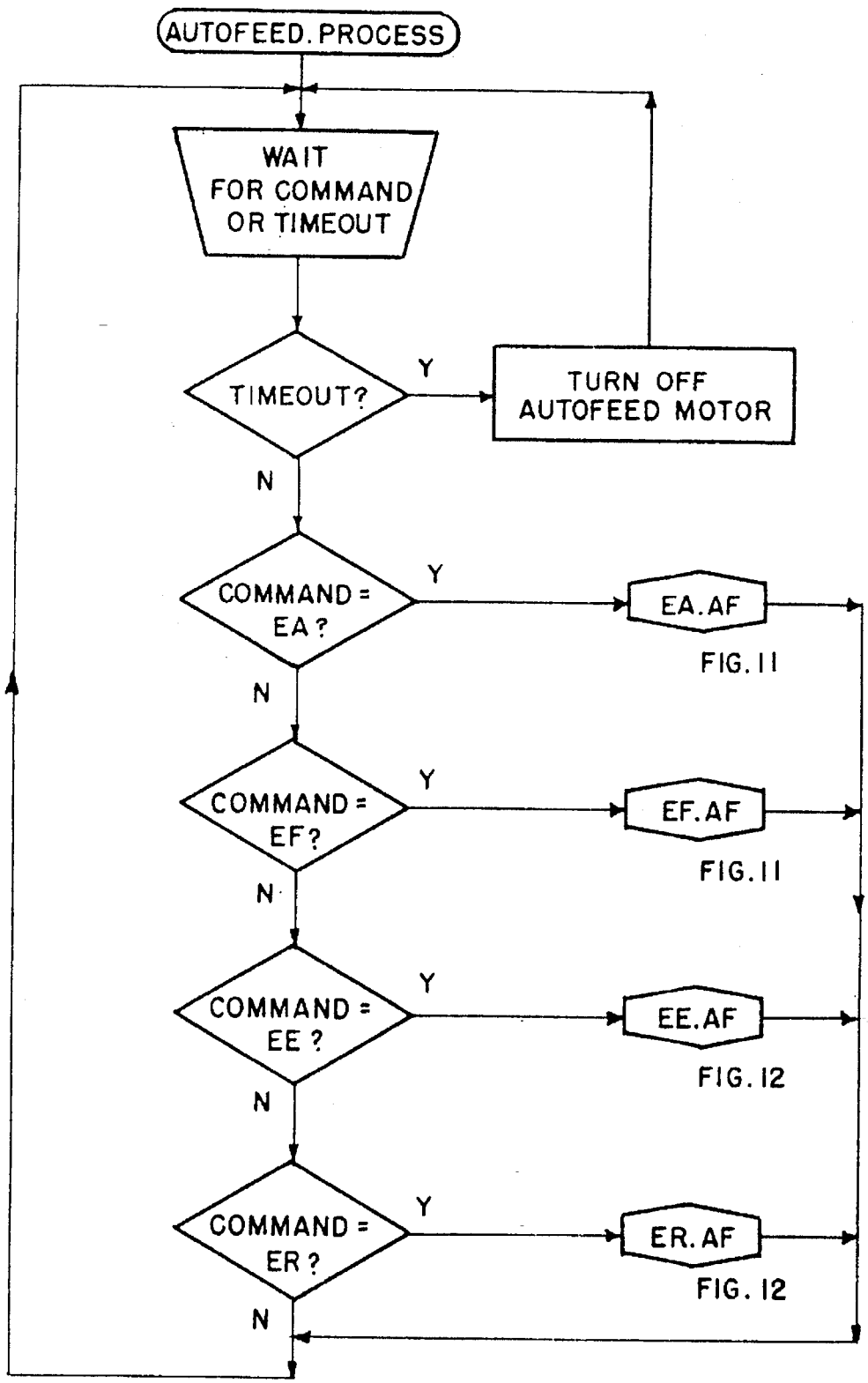
Figure 11:
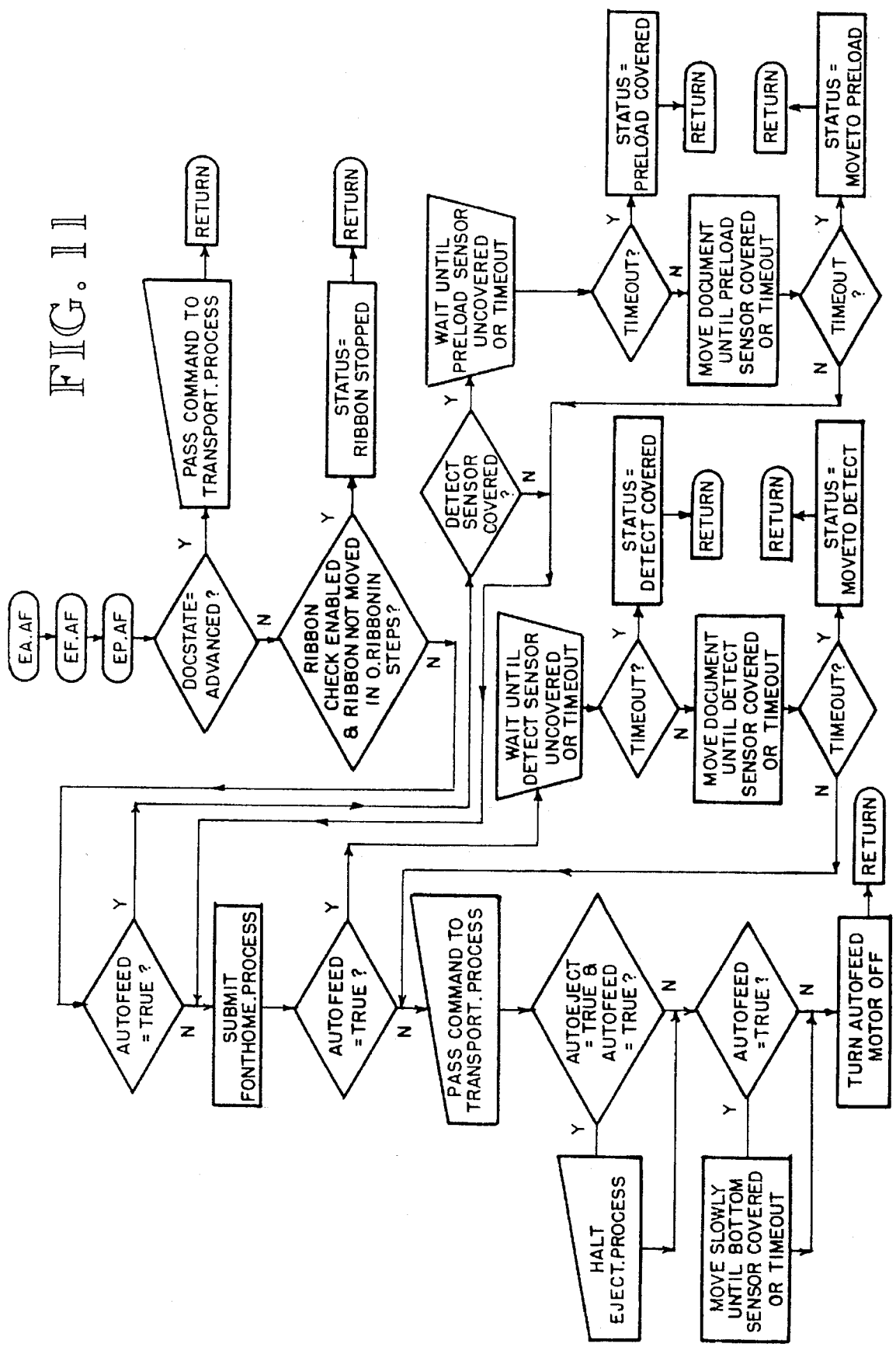
Figure 13:
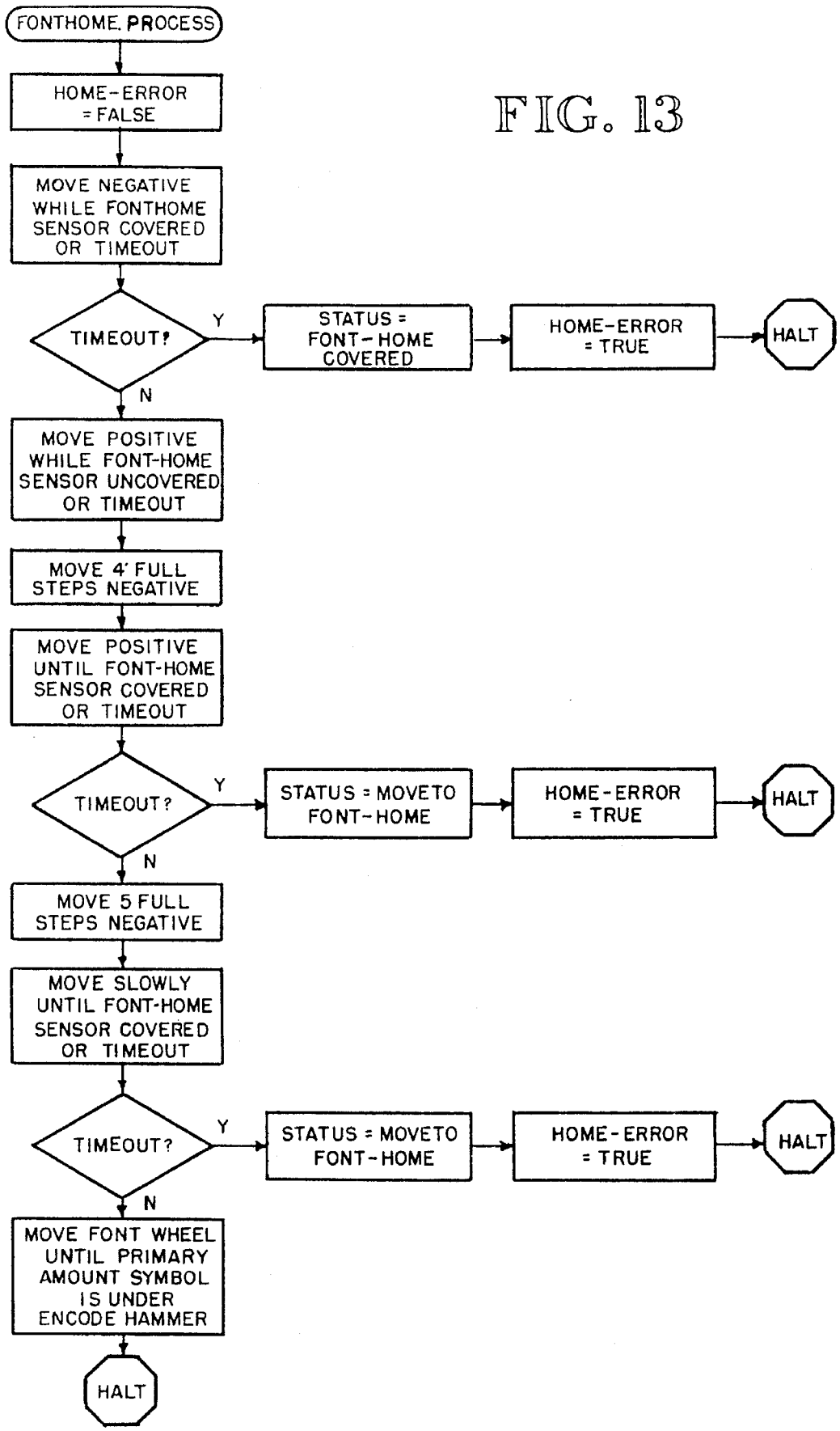
Figure 14:
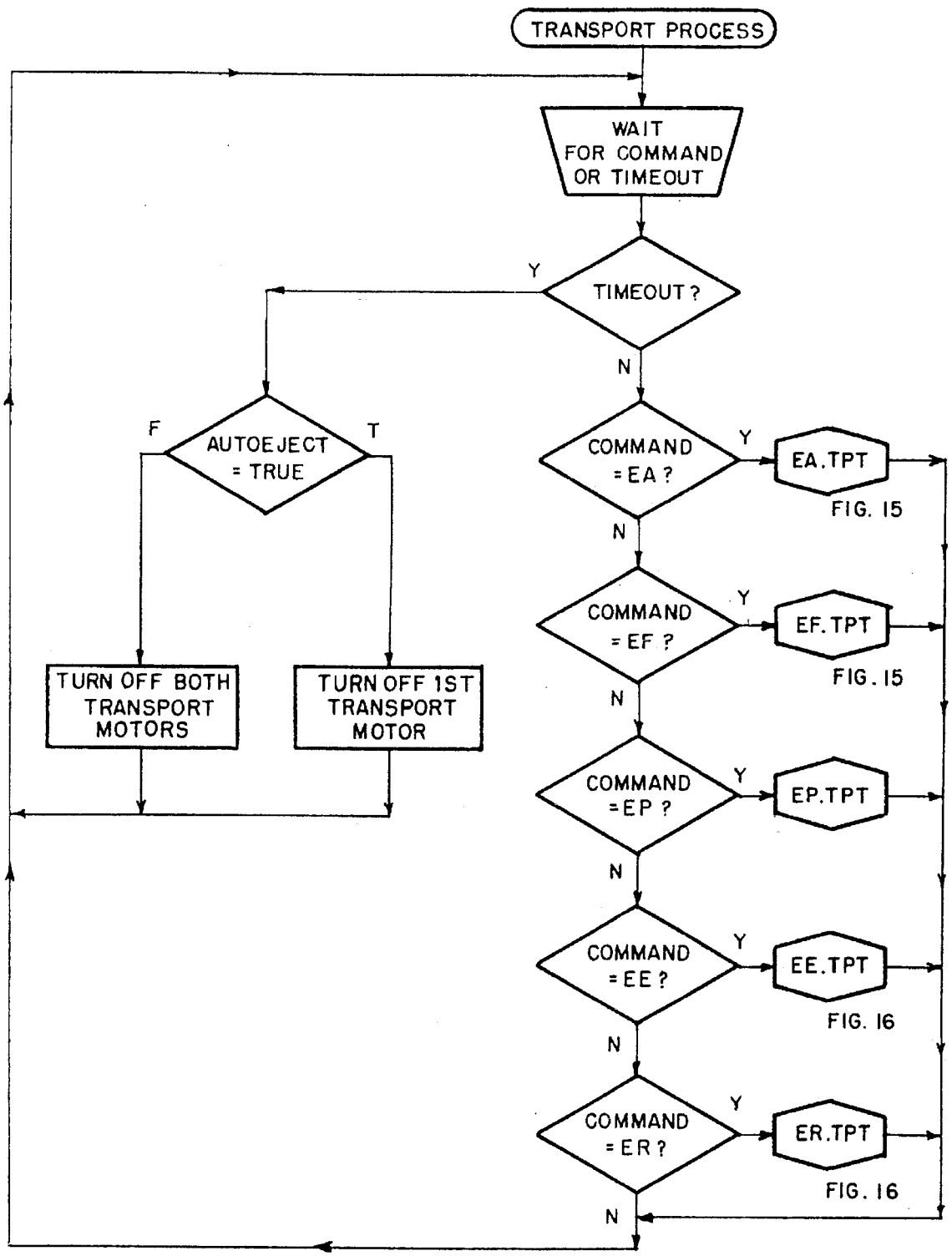
Figures 18, 22:
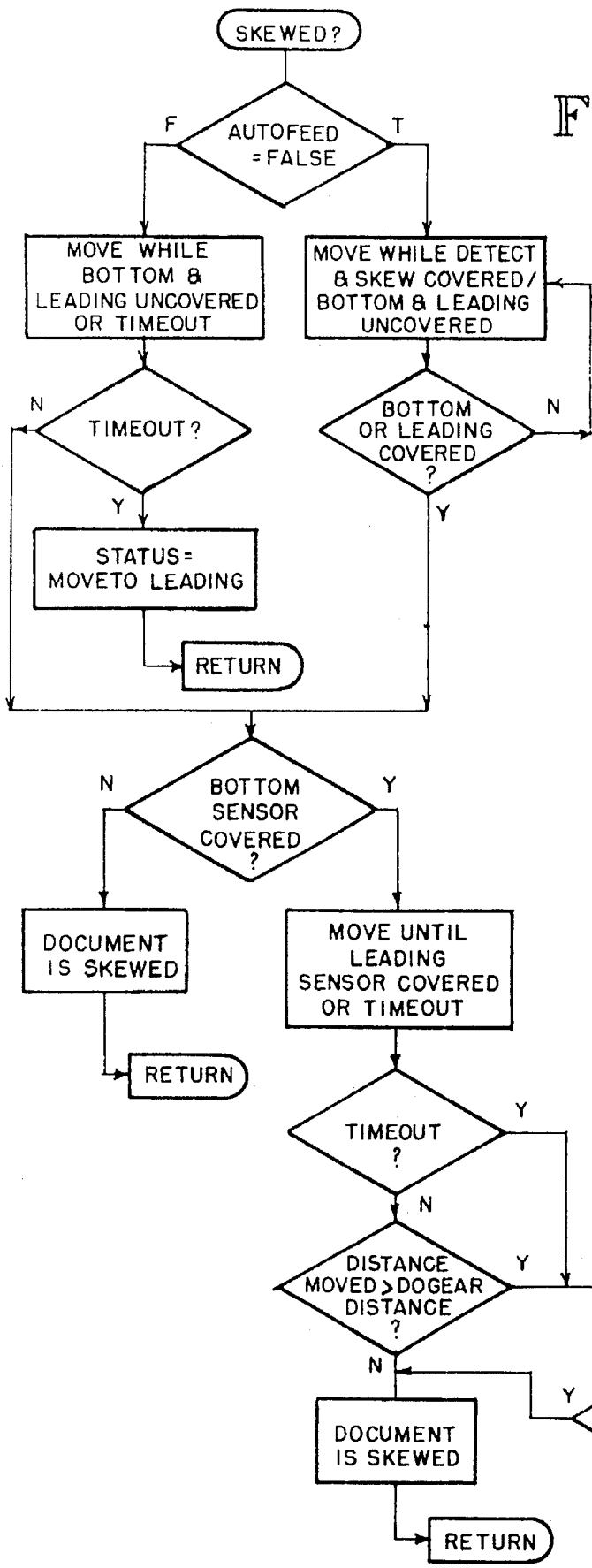
Figure 19:
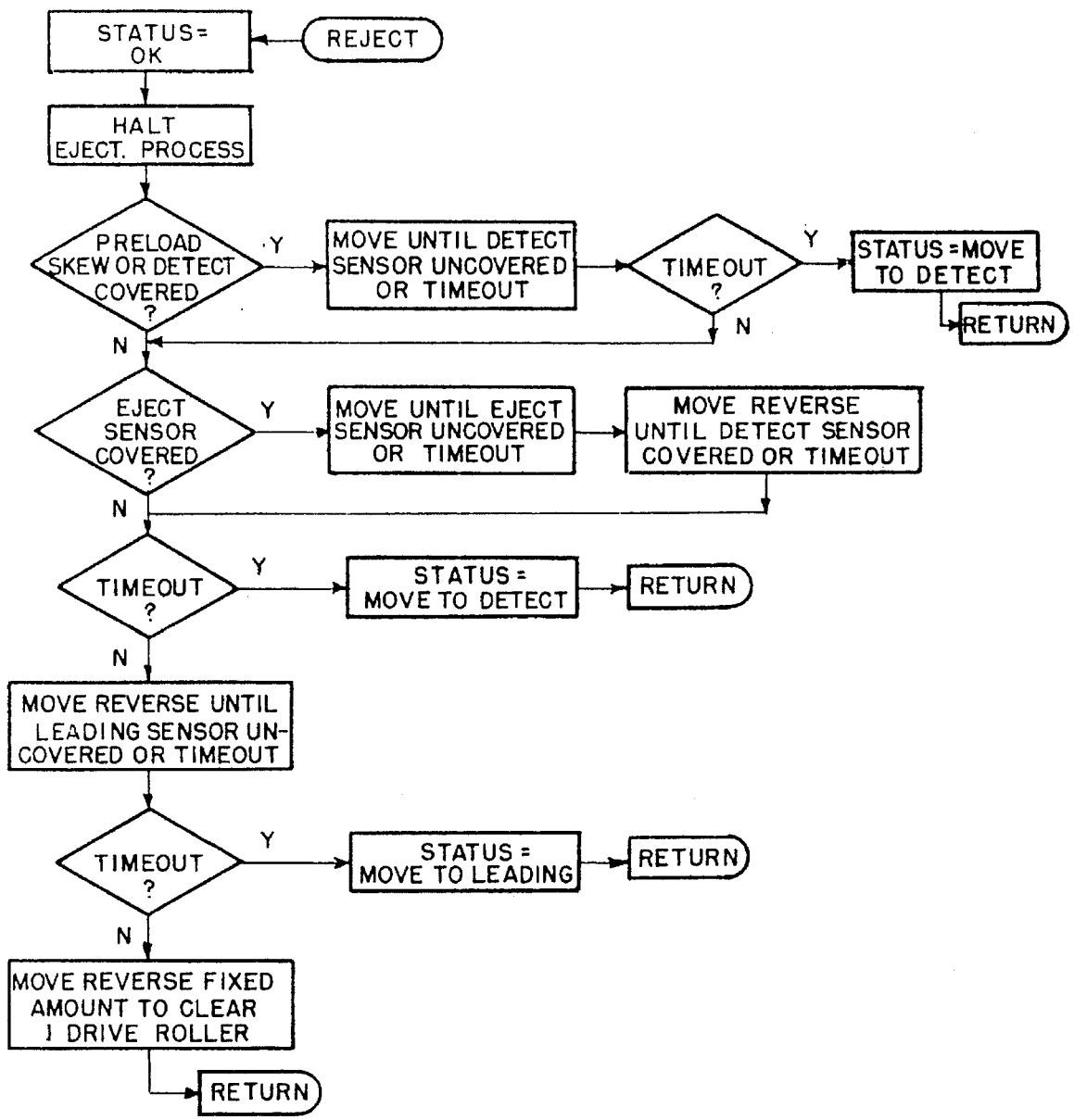
Figure 25:
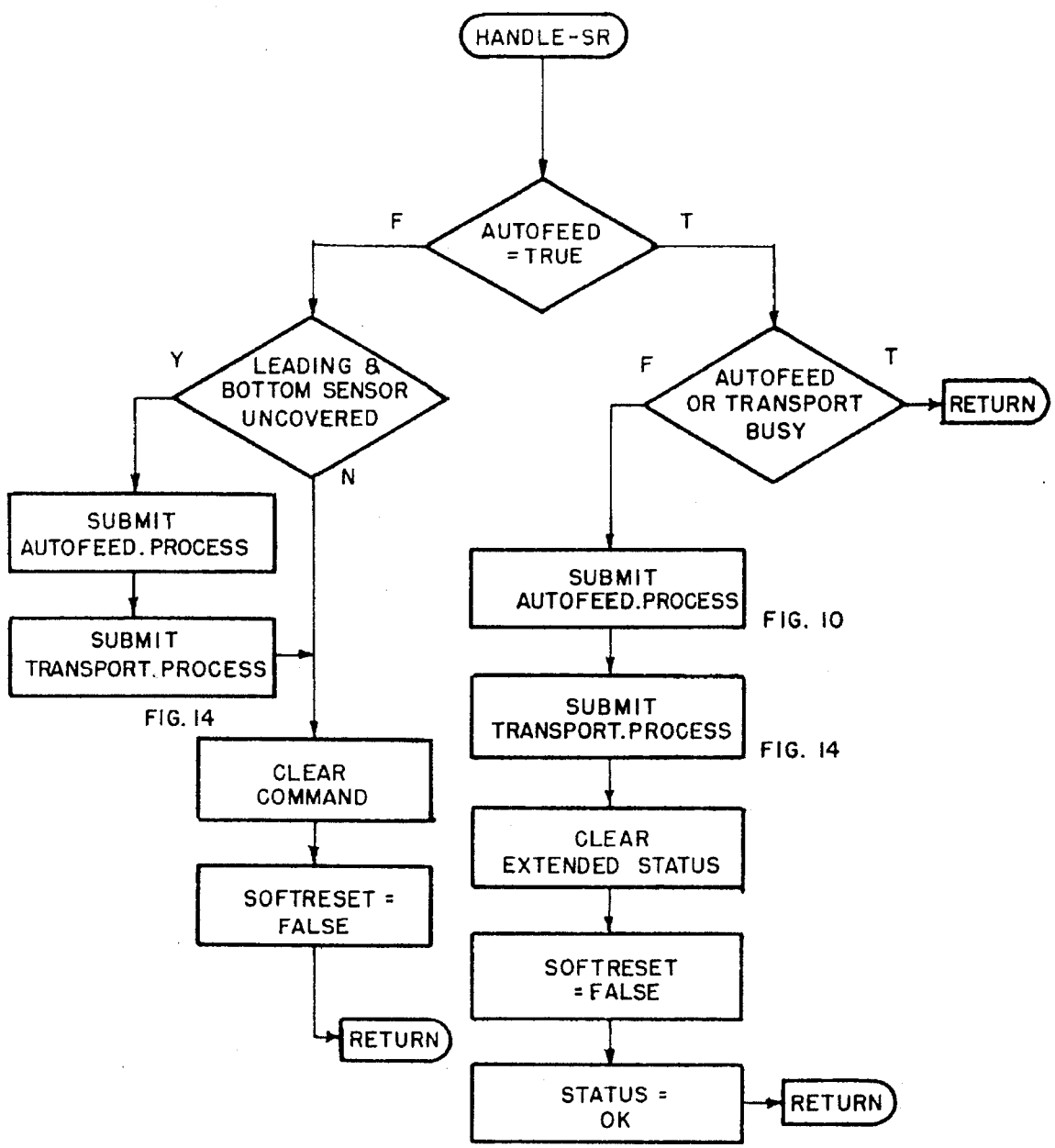
Figure 29:
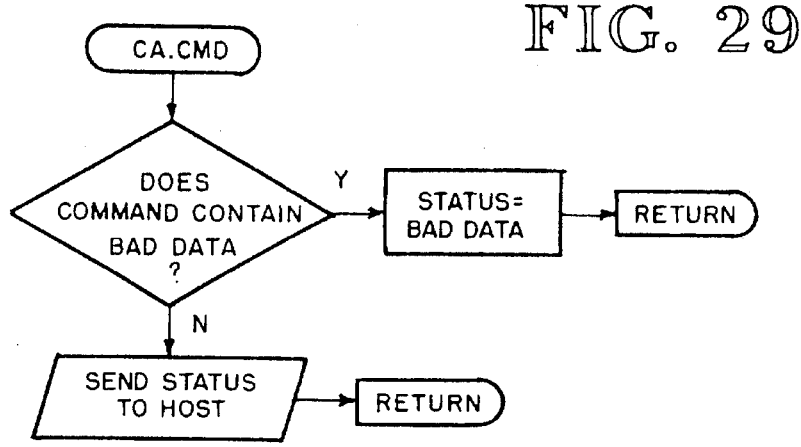
Figure 30:
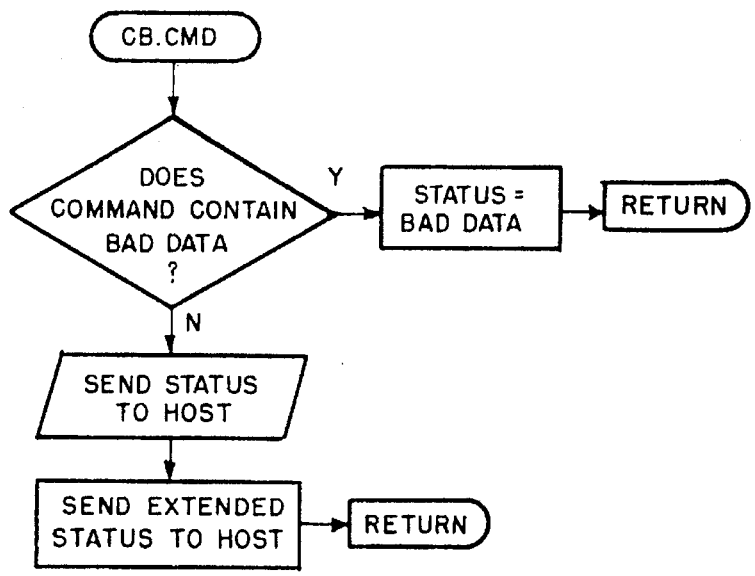
Figure 31:
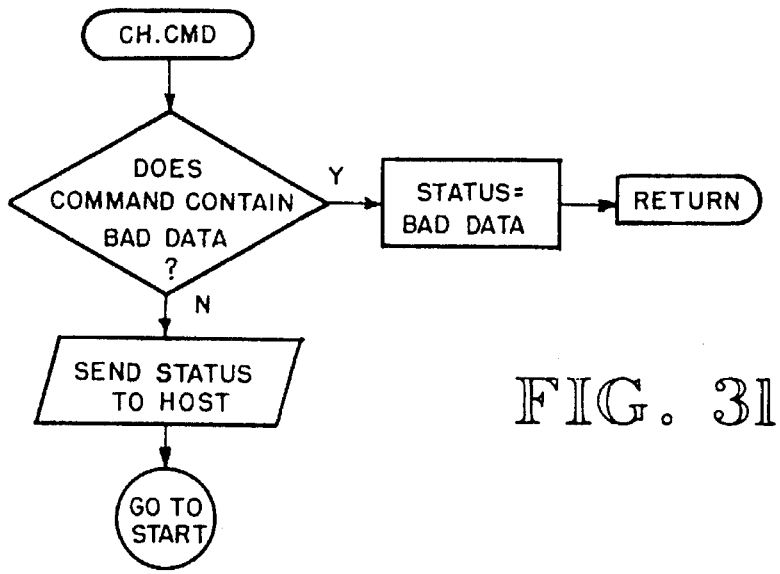
Figure 37:
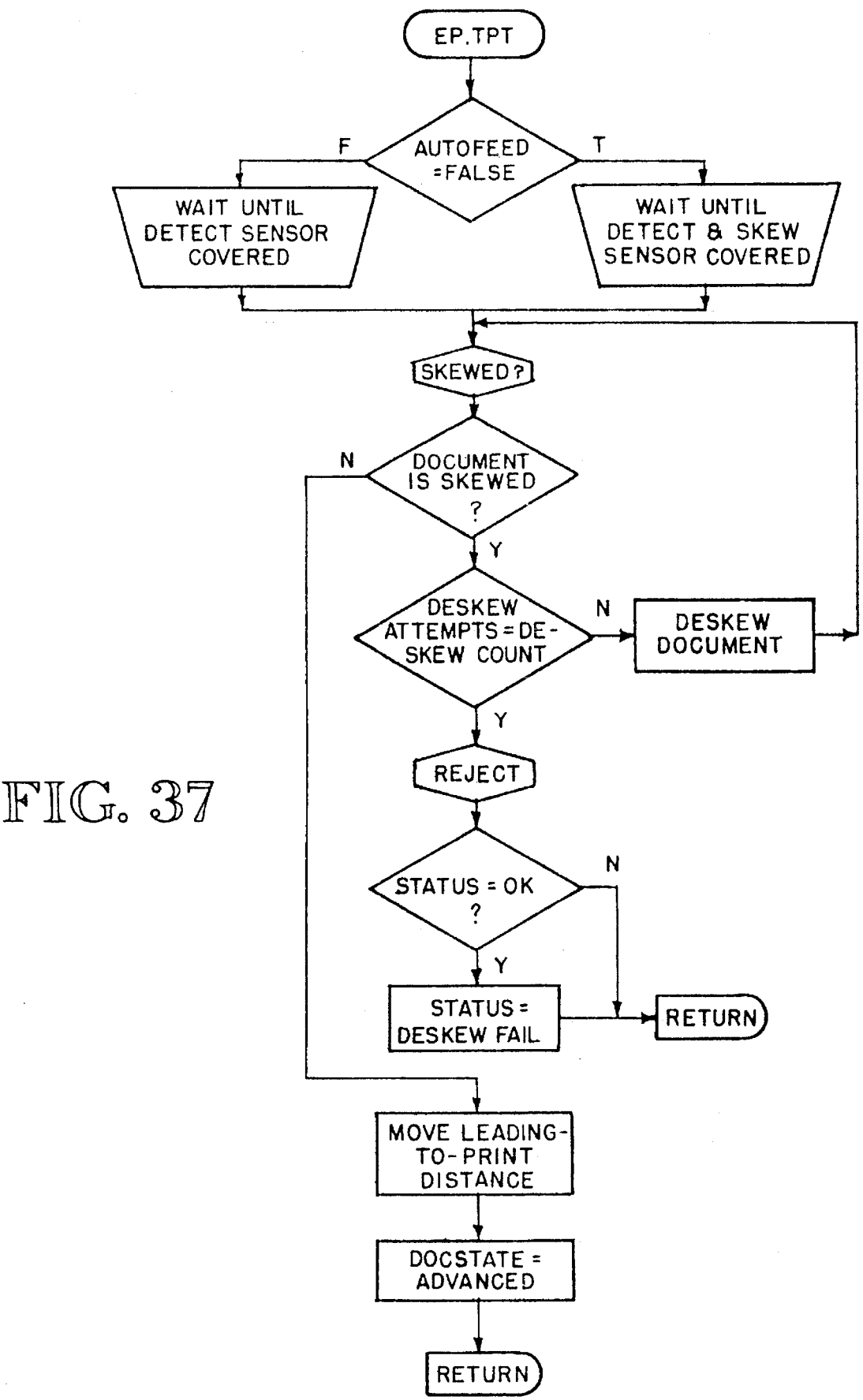
Figure 38:
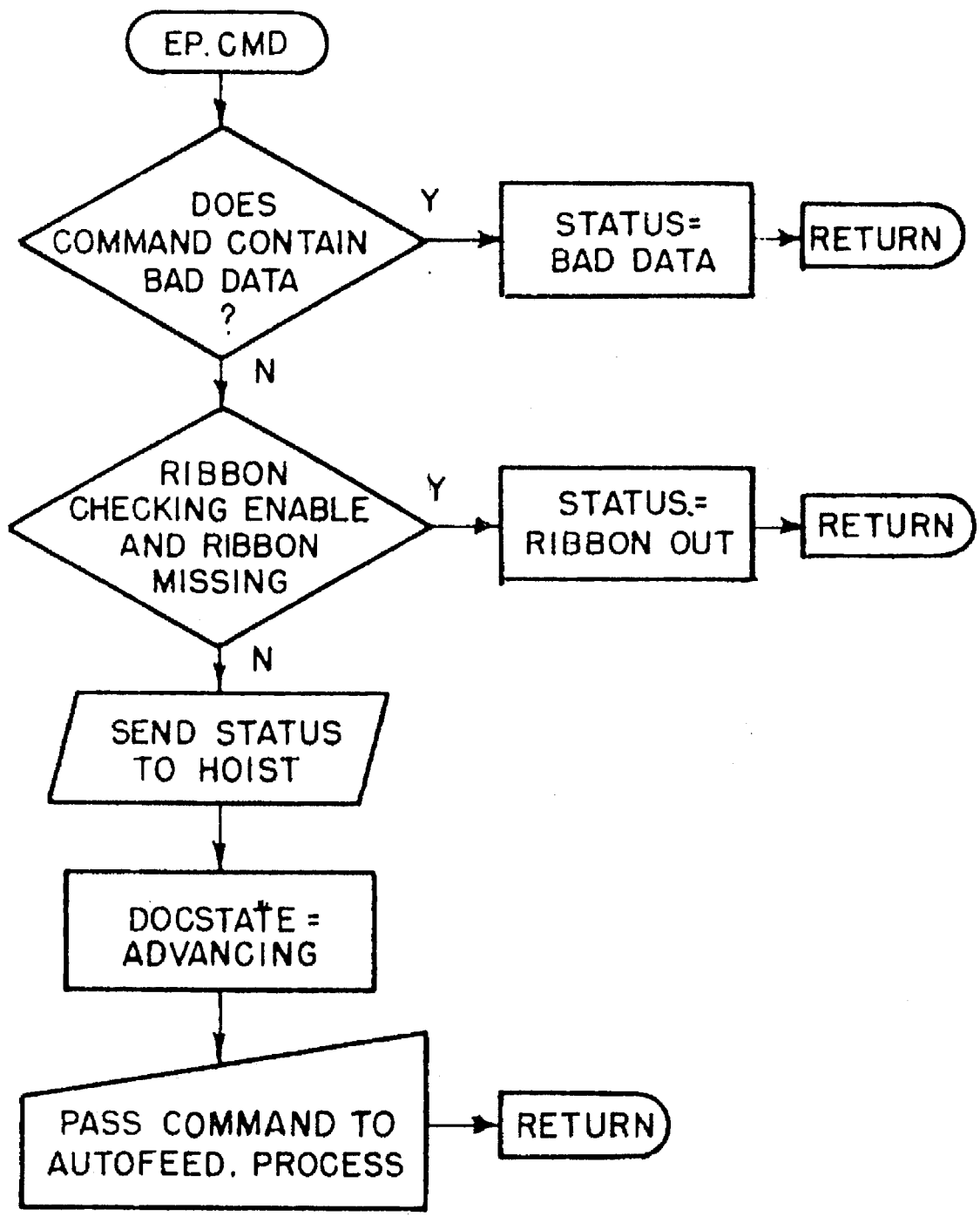

The hammer portion 106 of the encoder assembly is removably mounted in a slot in third wall member 76. FIGS. 6 and 7 show hammer assembly 106. It includes a hammer element 108 and a mounting frame portion 110. Frame portion 110 includes a relatively thin but rigid strip 111 forming a rectangle. In the specific embodiment shown, rectangle strip 111 is 1 inch long by ½ inch wide, with the strip itself being 0.080 inch square in cross-section. Frame portion 110 mates with a slot formed in third wall member 76. Extending from the upper end of rectangular strip 111 is an elongated arm 112 having a small tab 114 at the very top thereof. The arm 112 permits the entire hammer to be readily inserted and removed relative to the slot formed in third wall member 76. At the top of rectangular strip 111 is an extending lip 115 which butts against the top edge of wall member 76.

Extending downwardly from the lower end of arm 112 into the open center area of rectangular strip 111 is the hammer element 108, at the end of which is a contact element 118. Hammer element 108 has a slight curve to it so that contact element 118 is positioned somewhat out of the plane of rectangular strip 111, as shown most clearly in FIG. 6. Hammer element 108 is relatively thin, so that it is movable relative to the frame portion 110. At the top end of hammer element 108 is an extending button element 113 which is press fitted into a mating opening 117 in the lower end of arm 112.

The third wall member 76 has an opening therethrough which corresponds to the position of contact element 118 when the hammer 106 is correctly inserted in the slot in third wall member 76. In operation of the encoder, font wheel 104 is rotated to the point where the desired character to be printed on the check is in registry with the contact element 118 and the opening in the third wall member. The solenoid 100 is then energized, forcing the solenoid arm 102 forward, striking the contact element 118 which in turn moves forward with substantial force against the document, forcing it and the intermediately positioned ribbon against the character on the font wheel, such that the ink on the ribbon releases, producing the character on the check. This process, involving the successive advancement of the check, the rotation of the font wheel, advancement of the ribbon and activating of the solenoid, resulting in the encoding of successive preselected characters on the check, continues until all the desired encoding has been completed.

The check is then moved further along the check guide by first drive roller 72 until it encounters second drive roller 120 which operates in combination with eject roller 122. Second drive roller 120 includes a stepper motor 124 and an aluminum roller 125 which is substantially identical to roller 80. The distance between drive rollers 72 and 120 is such that the check will always be under the control of one drive roller and for a time will be under control of both drive rollers. Further, the overall arrangement of the check guide path is sufficiently compact that encoding of the check can begin before the check is completely free from the autofeed roller. Eject roller 122 includes a roller element 129 of plastic, approximately 2½" in diameter by ¼" thick, the roller element having an O-ring positioned in a peripheral groove thereof. Roller element 129 is free to rotate about a vertical axis 131. The check, upon reaching the eject roller 122 and second drive roller 120, wraps around eject roller element 129, between the urethane O-ring in the edge thereof and a fifth wall member 128. Drive roller 120 extends through an opening in the fifth wall member 128 to contact the roller element 129. The check comes off the eject roller at the other side thereof, such that the check is now moving in substantially the opposite direction, fifth wall member 128 being slightly more than hemispherical.

At the end of fifth wall element 128 is a flexible flap 127 which maintains the check in line as it comes off the eject roller, moving toward the left of the apparatus in FIG. 1, in channel 130. Channel 130 inclines slightly upwardly from right to left in FIG. 1. The top portion of the check encounters an angled edge 132 (FIG. 2) of an upper surface plate 134 of the apparatus, forcing the check to fall backwardly out of channel 130 into a catch tray 134, with the checks landing flat and face down, as shown in FIGS. 1 and 2.

In operation of the apparatus, the encoded checks form a pile in the catch tray 134. The checks may be conveniently removed via a large slot 136 at the rear of the catch tray. As the checks pass from the eject roller 122, an eject sensor 138 senses that the trailing end of the check has left the roller.

The control of the apparatus is accomplished by software in a dedicated microprocessor via electrical commands to the various elements, using information provided by the various sensors. The various sensors are automatically calibrated, on a regular basis, typically in a particular sequence to prevent crosstalk, by detection of the level of light reaching the light detector portion of each sensor assembly from the LED (light emitter) portion. Light detection failure and/or LED failure can thereby be detected; further, if a low light level is detected, the electrical current to the sensor assemblies is automatically increased in order to increase the light level for proper operation.

A software flow chart for the control of the apparatus is shown in FIGS. 9–38. All the functional steps described above are set forth in the flow chart.

Figure 5:
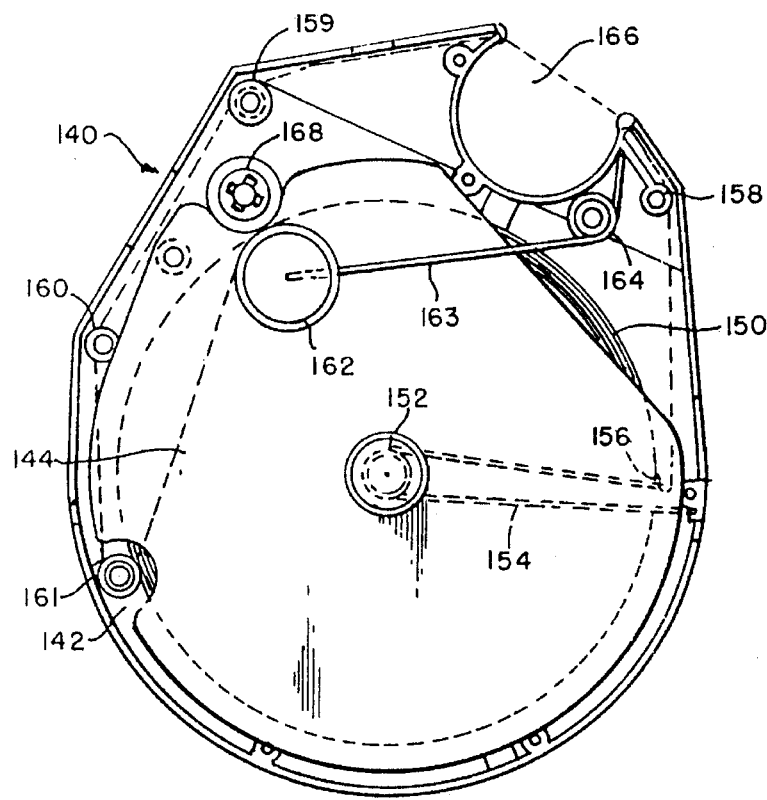
FIG. 5 is a bottom plan view of the ribbon cartridge useful with the encoder apparatus of FIGS. 1–4.

FIG. 5 shows a novel ribbon cartridge of the present invention. The ribbon cartridge shown generally at 140 includes a cartridge body 142 generally similar in outline to conventional cartridge bodies, but including a mid-element 144 which is a relatively thin, flat member positioned within the cartridge body at approximately mid-height thereof, dividing the interior of the ribbon cartridge into upper and lower compartments. In FIG. 5, cartridge 140 is viewed from the lower surface thereof. A conventional pancake ribbon 150 is positioned on a center spool 152 in the upper compartment with the center spool 152 being connected to an interior edge of the cartridge body by a spring element 154, which is a tensioning spring allowing the free turning of the pancake ribbon.

The ribbon is directed around a guide portion 156 of spring 154 near the interior edge of the cartridge body and then through a series of guide elements 158–161 positioned around a portion of the interior periphery of the cartridge body. At guide elements 159 and 160, the ribbon is gradually directed from the upper compartment to the lower compartment and at 161, the ribbon reverses direction to a take-up spool 162 in the lower compartment. Take-up spool 162 is mounted on one end of a spring 163 which has a pivot point 164 close to the interior wall of cartridge 140.

In the peripheral wall of ribbon cartridge 140 is an opening 166, across which the ribbon extends, between guide elements 158 and 159. It is this portion of the ribbon which is used for the encoding.

The ribbon is wound up on take-up spool 162 by rotation of a traction gear member 168. Take-up spool 162 is biased against traction gear 168 by spring 163. A motor engages gear 168, rotating it, forcing the ribbon to advance. As the ribbon is wound on the take-up spool 162, the take-up spool moves counterclockwise about pivot point 164 to accommodate the ribbon. This continues until the ribbon is completely wound up on the take-up spool 162.

The ribbon cartridge assembly also features two sensors associated with the operation of the ribbon cartridge. The first is a ribbon-out sensor. The ribbon-out sensor, referring to FIG. 1, includes an LED 170 and a light detector 171 positioned at opposite sides of the ribbon cartridge. They are positioned such that a straight line connecting them is slightly off the hub of the supply reel (when empty) for the ribbon, in the upper compartment of cartridge 140, when the ribbon cartridge is positioned in the encoder. As long as light between LED 170 and light detector 171 is blocked, ribbon is still present. When the detector 171 first recognizes light, the ribbon is nearly out, and it is now time to change the ribbon. However, the physical arrangement is such that there is still enough ribbon to completely process the one document then being encoded, unlike existing end of tape indicators, such as reflective coating.

The other sensor is known as a ribbon-in-motion detector, shown at 172, comprising an LED and a light sensor. The ribbon-in-motion detector detects that the ribbon is, in fact, still moving in the cartridge and has not jammed or otherwise malfunctioned. The ribbon-in-motion detector 172 is mounted on base plate 32 such that its LED/detector elements are located on opposite sides of the ribbon, relatively close to opening 166 in the cartridge. Detector 172 detects the absence of ink on the ribbon, where a character should have been lifted off during the encoding process. A moving ribbon will exhibit differences in the pattern of ink removal as different characters are encoded. Lack of change in the ink pattern on the ribbon is an indication that the ribbon is jammed or that the mechanism has otherwise malfunctioned, i.e. it is not moving.

Hence, a MICR encoder has been described which has a particular structural arrangement such that the resulting encoder is compact, integrated, reliable in operation, and easy to operate. Particular features include a removable hammer element and a new ribbon cartridge.

Although a preferred embodiment of the invention has been disclosed for illustration, it should be understood that various changes, modifications, and substitutions may be incorporated in such embodiment without departing from the spirit of the invention as defined by the claims which follow.

We claim:

1. A ribbon cartridge for use in document encoders, comprising:

a ribbon cartridge body, including an internal divider element defining first and second portions within the cartridge body, the cartridge body including an opening at one end of the periphery thereof across which ribbon from the cartridge is moved;

a feed spool mounted in the first portion of the cartridge body, the feed spool containing unused ribbon wrapped thereon;

ribbon guide means through which the ribbon extends from the feed spool for guiding the ribbon, the ribbon guide means positioned such that the ribbon moves across the opening in the cartridge body;

a take-up spool located in the second portion of the cartridge body, on which used ribbon from the feed spool winds;

means for moving the ribbon from the feed spool onto the take-up spool; and wherein the periphery of the cartridge body is only slightly greater than the periphery of a full feed spool for approximately at least fifty percent of the feed spool periphery, the remaining periphery of the cartridge body being somewhat further away from the periphery of the feed spool so as to permit the presence of a font wheel between the periphery of the cartridge body and the feed spool when the cartridge is operatively positioned on the encoder, the remaining periphery of the cartridge body having an opening therein across which the ribbon extends, wherein said opening is similar to the diameter of the font wheel, substantially less than the width of the cartridge body.

2. An apparatus of claim 1, including a spring connecting the feed spool to the cartridge body, the spring including a portion thereof through which the ribbon extends.

3. An apparatus of claim 1, including a spring connected to the take-up spool, the spring being mounted so that it rotates about a pivot point, with the spring and the take-up spool rotating about the pivot point as ribbon is wound up on the take-up spool.

4. An apparatus of claim 3, wherein the moving means includes a sprocket gear element, having a peripheral edge which contacts the ribbon as it is wound on the take-up spool, wherein said spring is mounted so that it tends to bias the take-up spool with the ribbon thereon against the sprocket, such that rotation of the sprocket results in ribbon being wound on the take-up spool.

\* \* \* \* \*

(12) REEXAMINATION CERTIFICATE (4502nd)

United States Patent
Graverholt et al.

(10) Number: US 5,529,409 C1
(45) Certificate Issued: Dec. 11, 2001

(54) RIBBON CARTRIDGE FOR A COMPACT REMOTE-DRIVEN ENCODER

(75) Inventors: James M. Graverholt, Woodinville; William L. Landsborough, Bothell, both of WA (US)

(73) Assignee: Maverick International, Inc., Mukilteo, WA (US)

Reexamination Request:
No. 90/005,605, Jan. 4, 2000

Reexamination Certificate for:
Patent No.: 5,529,409
Issued: Jun. 25, 1996
Appl. No.: 08/393,867
Filed: Feb. 23, 1995

Related U.S. Application Data

(62) Division of application No. 08/123,001, filed on Sep. 16, 1993, now Pat. No. 5,474,393.

(51) Int. Cl.⁷ .................................................. B41J 35/28
(52) U.S. Cl. ..................... 400/208; 400/208.1; 400/234; D18/12
(58) Field of Search ................................. 400/207, 208, 400/208.1, 217, 234, 235, 236; D18/12

(56) References Cited

U.S. PATENT DOCUMENTS

| D. 307,437 | * | 4/1990 | Costa ............................ D18/12 |
| D. 313,612 | | 1/1991 | Rossopoulos . |
| D. 322,272 | | 12/1991 | Maina . |
| 4,034,935 | | 7/1977 | Plaza et al. ..................... 242/197 |
| 4,131,374 | | 12/1978 | Porterfield ...................... 400/208 |
| 4,302,118 | * | 11/1981 | Schaefer ......................... 400/208 |
| 4,337,001 | | 6/1982 | Cappotto ........................ 400/208 |
| 4,406,553 | | 9/1983 | Nally et al. .................... 400/208 |
| 4,413,919 | | 11/1983 | Applegate et al. ............... 400/208 |
| 4,492,483 | | 1/1985 | Guillaume ...................... 400/208 |
| 4,505,605 | | 3/1985 | Hasegawa et al. ............... 400/208 |
| 4,552,473 | | 11/1985 | Pawlak .......................... 400/208 |
| 4,609,298 | | 9/1986 | Shioda .......................... 400/208 |
| 4,650,351 | | 3/1987 | Engle et al. .................... 400/120 |
| 4,661,004 | * | 4/1987 | Applegate et al. ............... 400/208 |
| 4,668,961 | | 5/1987 | Hiramatsu .................. 400/208 X |
| 5,026,181 | | 6/1991 | Ahn ............................. 400/208 |
| 5,085,531 | | 2/1992 | Gillio ........................... 400/234 |
| 5,152,621 | | 10/1992 | Tsuji ............................ 400/208 |
| 5,474,393 | | 12/1995 | Abbott et al. .................. 400/105 |

FOREIGN PATENT DOCUMENTS

3744648 * 8/1988 (DE) .................................... 400/208

OTHER PUBLICATIONS

IBM Technical Disclosure Bulletin (vol. 29 No. 12) "Automatic Ribbon Tensioner", pp. 5567–5568, May 1987.*

(List continued on next page.)

*Primary Examiner*—Stephen R. Funk

(57) ABSTRACT

The encoder cartridge includes a cartridge body which is divided interiorly into upper and lower portions. A ribbon is mounted on a feed spool in the upper portion and feeds through a series of guide elements to a lower portion which includes a take-up reel upon which the ribbon is wound by a traction gear member which is in turn advanced by a motor. The cartridge body is configured to match closely that of the feed spool and take-up reel, with an opening at one end of the body for the ribbon, the opening being substantially smaller than the width of the cartridge and similar to the diameter of the encoder font wheel.

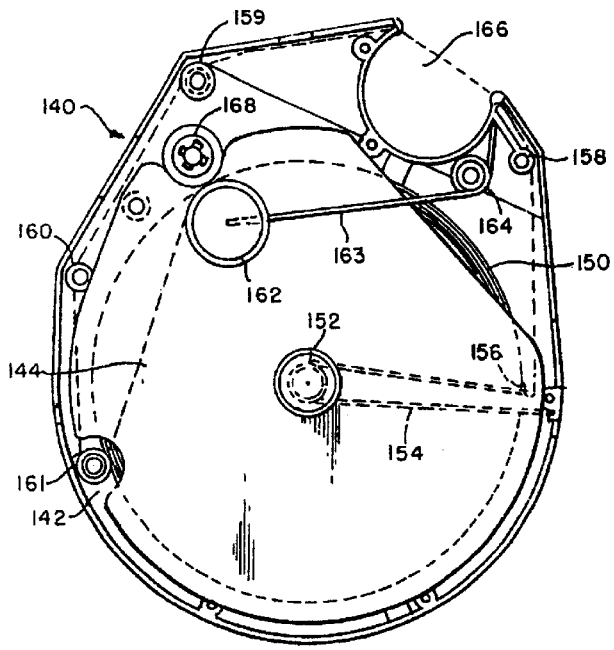

OTHER PUBLICATIONS

IBM Technical Disclosure Bulletin (vol. 27 No. 1A) "Ribbon Feed Mechanism", J.A. Craft, pp. 204–207, Jun. 1984.*

Printed publication from R & B Product–Info with translation for an NEC Spinwriter (5500) two tier film ribbon cartridge dated Feb. 1981.

Turbon International printed publication with translation for the NEC 5500 film ribbon cartridge (shown in Exh. A above) dated 1992.

Turbon International printed publication with translation for a Canon AP two tier film ribbon cartridge invented since 1984 (fitting numerous Canon printing products 100–500) dated 1992.

Turbon International printed publication with translation for a film ribbon cartridge (part No. NW108.00) for a Nakajima AE800 Printer dated in 1992.

Turbon International printed publication with translation for a film ribbon cartridge (two tier) (part No. F208.00) for a Facit 8000 Printer (Drucker) dated in 1992.

Turbon International printed publication with translation for a two tier film ribbon cartridge (part No. I708.00) for an IBM 6750 Printer dated in 1986.

A printed publication from a CTS Service Manual for a CTS check encoder LM 100M using a CTS (Italy) MICR two tier film ribbon cartridge shown therein dated Jun., 1994 (the actual cartridge being invented prior to 1991 with the IBM technology of 1983 and 1987.

* cited by examiner

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

\* \* \* \* \*